US012417618B2

(12) United States Patent
Kim

(10) Patent No.: US 12,417,618 B2
(45) Date of Patent: Sep. 16, 2025

(54) METHOD AND APPARATUS FOR REAL-WORLD CROSS-MODAL RETRIEVAL PROBLEMS

(71) Applicant: Samsung Electronics Co., Ltd., Suwon-si (KR)

(72) Inventor: Minyoung Kim, Chertsey (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 468 days.

(21) Appl. No.: 17/971,098

(22) Filed: Oct. 21, 2022

(65) Prior Publication Data

US 2023/0154159 A1 May 18, 2023

(30) Foreign Application Priority Data

Nov. 8, 2021 (GB) ..................................... 2116033
Feb. 3, 2022 (GB) ..................................... 2201419

(51) Int. Cl.
*G06V 10/774* (2022.01)
*G06V 10/44* (2022.01)
*G06V 10/762* (2022.01)
*G06V 10/764* (2022.01)
*G06V 20/70* (2022.01)
*G06F 16/245* (2019.01)

(52) U.S. Cl.
CPC ............ *G06V 10/774* (2022.01); *G06V 10/44* (2022.01); *G06V 10/762* (2022.01); *G06V 10/764* (2022.01); *G06V 20/70* (2022.01); *G06F 16/245* (2019.01)

(58) Field of Classification Search
CPC .... G06V 10/774; G06V 10/44; G06V 10/762; G06V 10/764; G06V 20/70; G06V 10/82; G06V 20/41; G06F 16/245; G06F 18/22; G06F 18/23213; G06F 18/213; G06F 40/30; G06N 3/0442; G06N 3/008; G06N 3/045; G06N 3/0464; G06N 3/0895; G06N 3/00; G06N 3/04; G06N 3/08
USPC ....................................................... 382/159
See application file for complete search history.

(56) References Cited

U.S. PATENT DOCUMENTS

| | | | |
|---|---|---|---|
| 2021/0012150 A1 | 1/2021 | Liu et al. | |
| 2021/0191990 A1 | 6/2021 | Shi et al. | |
| 2021/0406601 A1* | 12/2021 | Narlikar | ................ G06F 18/213 |

FOREIGN PATENT DOCUMENTS

| | | |
|---|---|---|
| CN | 111209415 A | 5/2020 |
| CN | 112100410 A | 12/2020 |
| CN | 112148916 A | 12/2020 |

OTHER PUBLICATIONS

Cornell University Library, 2019, Yuki Markus Asano et al, Self-labelling via simultaneous clustering and representation learning, (Nov. 13, 2019), XP081603273.

(Continued)

*Primary Examiner* — Charlotte M Baker
(74) *Attorney, Agent, or Firm* — Jefferson IP Law, LLP

(57) ABSTRACT

Broadly speaking, the present application generally relates to a method for training a machine learning, ML, model to perform real world cross-modal retrieval problems, and to a computer-implemented method and apparatus for performing real world cross-modal retrieval problems such as including text-based video retrieval, sketch-based image retrieval, and image-text retrieval using a trained machine learning, ML, model.

16 Claims, 21 Drawing Sheets

(56) References Cited

OTHER PUBLICATIONS

Cornell University Library, 2021, Yuki M Asano et al, Labelling unlabelled videos from scratch with multi-modal self-supervision, (Feb. 28, 2021), XP081885943.
Cornell University Library, 2021, Brian Chen et al., Multimodal Clustering Networks for Self-supervised Learning from Unlabeled Videos, (Apr. 26, 2021), XP091045679.
Cornell University Library, 2021, Minyoung Kim, SwAMP: Swapped Assignment of Multi-Modal Pairs for Cross-Modal Retrieval, (Nov. 10, 2021), XP091096939.
Caron, M.; Misra, I.; Mairal, J.; Goyal, P.; Bojanowski, P.; and Joulin, A., 2020, Unsupervised Learning of Visual Features by Contrasting Cluster Assignments, In Advances in Neural Information Processing Systems.
GB Office Action dated Sep. 13, 2022, issued in GB Application No. 2201419.5.

* cited by examiner

| | |
|---|---|
|  | A man playing tennis outside on a sunny day |
|  | A gorgeous clock tower |
|  | A batter is swinging at a ball |
|  | A large clock on the top of a building |
| ... | ... |

| | | |
|---|---|---|
|  | A man playing tennis outside on a sunny day | y=1 |
|  | A batter is swinging at a ball | y=2 |
|  | The player hit the baseball | y=2 |
|  | A gorgeous clock tower | y=3 |
|  | Male tennis players on the court with rackets | y=1 |
|  | A large clock on the top of a building | y=3 |

FIG. 3B

| A man playing tennis outside on a sunny day | y=1 |
|---|---|
| A batter is swinging at a ball | y=2 |
| The player hit the baseball | y=2 |
| A gorgeous clock tower | y=3 |
| Male tennis players on the court with rackets | y=1 |
| A large clock on the top of a building | y=3 |

METHOD AND APPARATUS FOR REAL-WORLD CROSS-MODAL RETRIEVAL PROBLEMS

CROSS-REFERENCE TO RELATED APPLICATION(S)

This application is based on and claims priority under 35 U.S.C. § 119(a) of a United Kingdom patent application number 2116033.8, filed on Nov. 8, 2021, in the United Kingdom Patent Office, and of a United Kingdom patent application number 2201419.5, filed on Feb. 3, 2022, in the United Kingdom Patent Office, the disclosure of each of which is incorporated by reference herein in its entirety.

BACKGROUND

1. Field

The present application generally relates to a method for training a machine learning, ML, model to perform real world cross-modal retrieval problems, and to a computer-implemented method and apparatus for performing real world cross-modal retrieval problems involving image analysis such as including text-based video retrieval, sketch-based image retrieval, and image-text retrieval using the trained machine learning, ML, model.

2. Description of Related Art

Cross-modal retrieval is the task of retrieving the most relevant items in the database of one modality (e.g., images) for a given query from another modality (e.g., texts). Cross-modal retrieval has received unprecedented attention in AI, computer vision and related areas.

The crux of cross-modal retrieval is to learn the underlying relevance or similarity metric between data instances that live in heterogeneous modalities that exhibit highly different data distributions. Although there exist several different learning problem formulations in the literature, we mainly focus on the paired training data setup in which training is only supervised by the relevant pairs in the training data, and there are no semantic class labels annotated. That is, the training data consist of only pairs of relevant multi-modal data instances which may require minimal human annotation effort (e.g., web scraping of images and nearby texts).

FIG. 1A is an example of such training data which comprises pairs of data (image, text) and is thus an example of the typical image-caption (image-text) cross-modal retrieval problem. Given the training data comprises image-text pairs, the goal is to learn the feature extractors; one for the image and one for the text such that features of image (I) and text (T) are close to each other if I and T are paired, and far apart otherwise. This can be expressed as:

Img: $I \to \phi_I(I)$

Txt: $T \to \phi_T(T)$ such that $\phi_I(I) \approx \phi_T(T)$ if $(I, T)$ is paired, and vice versa where $\phi_I$ is the feature extractor for the images I and $\phi_T$ is the feature extractor for the text T.

In the cross-modal retrieval problem, the training is typically only supervised by the relevant multi-modal pairs in the data. The contrastive learning approach is the most popular approach for this task. The contrastive learning approach aims to learn the cross-modal similarity measure by the intuitive criteria that pull together relevant pairs and push away irrelevant ones. However, its sampling complexity for learning is quadratic in the number of training data points. Moreover, it makes potentially wrong assumption that the instances in different pairs are automatically irrelevant.

The contrastive learning approach is illustrated in FIG. 1B. The relevant pairs are connected by the solid, horizontal lines and the irrelevant pairs by the dotted, angled lines. The contrastive learning approach has two major drawbacks: i) its pair-based loss requires quadratic sampling complexity in the number of training data points, and ii) it makes potentially wrong assumption that the instances in different pairs are automatically irrelevant. In other words, there are $O(N^2)$ or $O(N^3)$ pairwise terms which often require a large batch size. The pairs in the training data are usually collected by considering relevant pairs only (e.g., nearby image/text snippets in a web page), and the relevance of instances in different pairs is usually not checked. For example as illustrated in FIG. 1B, the examples in the second and fourth rows are in fact relevant, but pushed away in the contrastive learning. However, this is implicitly assumed in the contrastive loss.

The present applicant has recognized the need for an improved learning algorithm that addresses these drawbacks.

SUMMARY

In a first approach of the present techniques, there is provided a computer-implemented method for training a machine learning, ML, model comprising a first feature extractor and a second feature extractor, the method comprising: obtaining a dataset comprising a plurality of pairs of data instances, with each pair comprising a first data instance having a first modality and a second data instance having a second modality; evaluating the second feature extractor for the plurality of second data instances; assigning a first set of class labels to the plurality of first data instances based on the evaluated second feature extractor; training the first feature extractor using the assigned first set of class labels; evaluating a first feature extractor for the plurality of first data instances; assigning a second set of class labels to the plurality of second data instances based on the evaluated first feature extractor; and training the second feature extractor using the assigned second set of class labels The first modality may be image (either a single image or a video image). The second modality may be text (e.g. a caption or label which is paired with the image or a query which is paired with the video). The first and second modalities may be reversed. When one or both of the modalities relates to an image, the extracting step may be considered to be image processing.

Evaluating the second feature extractor for the plurality of second data instances may comprise extracting a set of features of each of the evaluated second data instances. Evaluating may thus generate a feature space comprising the feature vectors for the second data instances (and their respective pairs of first data instances) and the second data instances may be clustered within the feature space. Similarly, evaluating the first feature extractor for the plurality of first data instances may comprise extracting a set of features of each of the evaluated first data instances. For example, when the first data instance is an image, the image may be processed to extract a set of image features. Evaluating may thus generate a feature space comprising the feature vectors for the first data instances (and their respective pairs of second data instances) and the first data instances may be clustered within the feature space.

The features may be extracted using any suitable techniques. For example, for a video image the extracted set of features may be a concatenation of frame-level and video-level features extracted from the pretrained 2D/3D CNNs. For example, the text features may be any suitable features such as the GoogleNews pre-trained word2vec embeddings. Each image may be represented by a set of local features $v_i$:

$V=\{v_1, \ldots, v_k\}$, with $v_i (\in \mathbb{R}^D) = W_v f_i + b_v$ and where the raw features $f_i$ s are fixed and $\{W_v, b_v\}$ are learnable parameters. Similarly, each piece of text may be treated as a set of word features et:

$E=\{e_1, \ldots, e_n\}$, where $e_i (\in \mathbb{R}^D) = (h_i^{lr} + h_i^{rl})/2$ where $h_i^{lr/rl}$ are the outputs of the bi-directional GRU (gated recurrent unit) with the sequence of word embeddings as input.

Clustering of the first and second data instances in the associated features spaces may be achieved by any suitable technique, for example using K-means or the self-labelling approach described in "Self-labelling via simultaneous clustering and representation learning" by Asano et al published in International Conference on Learning Representations in 2020. It will be appreciated that the clustering of the second data instances may be different from the clustering of the first data instances. The clustering may be used to assign the first and second sets of class labels. In other words, assigning the first set of class labels may comprise determining the number of class labels from the number of clusters and assigning each first data instance (and its paired second data instance) in a cluster the same class label. Similarly, assigning the second set of class labels may comprise determining the number of class labels from the number of clusters and assigning each second data instance (and its paired first data instance) in a cluster the same class label. Alternatively, the number of clusters may be determined by the numbers of classes which are to be labelled. The number of classes may be between 500 and 1000, more particularly between 700 and 1000.

Each cluster label (i.e. each class label) may be regarded as a variable in an optimization problem whose objective function measures the similarity of cohesiveness of data points that belong to the same cluster label. The optimization problem may be solved to obtain the cluster labels for data instances in the first modality and when solving the optimization problem, the features of the data instances in the first modality are fixed. The cluster labels for data instances in the first modality may then be used to update the features of the data instances in the second modality, e.g. using cross-entropy loss minimisation. Similarly, the optimization problem may be solved to obtain the cluster labels for data instances in the second modality and when solving the optimization problem, the features of the data instances in the second modality are fixed. The cluster labels for data instances in the second modality may then be used to update the features of the data instances in the first modality, e.g. using cross-entropy loss minimisation. The steps of solving the optimization problem and updating the features may be repeated.

Each paired first and second data instance will have the same class label as well as other paired first and second data instances in the same cluster. In this way, other paired data instances may be deemed relevant if they belong to the same class labels. The class labels are not known and each training step may use self-supervised learning to learn (optimise) the first and second feature extractors together with the class labels. Cross-entropy minimisation may be used for each training step.

The method may further comprise defining a first linear classifier (i.e. first classification model) for the first modality, a second linear classifier (i.e. second classification model) for the second modality and a set of training parameters which are shared between the first and second modalities. The first linear classifier may process an image to classify the image. The first and second linear classifiers may be built on the extracted features. The first and second linear classifiers may be denoted by $p(y|x^A)$ and $p(y|x^B)$ and may be defined as, $$p(y=j|x^M) = \frac{\exp(p_j^T \phi^M(x)/\tau)}{\sum_i \exp(p_i^T \phi^M(x)/\tau)}, M \in \{A, B\}$$

where $P=\{P_1, \ldots, P_K\}$ are the trainable parameters that are shared between the two modalities, ($\phi^M$ represents the first and second feature extractors, $x^M$ represents the first and second feature data instances, y is the class label for class j, each $P_j$ may be regarded as the prototype vector for class j that lies in the shared feature space, and $\tau$ is the temperature in the softmax. Sharing the trainable parameters means that $\phi^A(\cdot)$ and ($\phi^B(\cdot)$ are not learnt independently from one another and are more interacted with each other.

The method may comprise using optimization to obtain the first and second linear classifiers. Each of the first linear classifier and the second linear classifier may be approximated by a first surrogate and a second surrogate respectively. Each surrogate may be considered to be an estimate of the true conditional class distribution for the corresponding linear classifier. In a first stage of the optimization, the first surrogate may be estimated using the current second linear classifier. Similarly, the first surrogate may be estimated using the current second linear classifier. In this first stage, the set of training parameters are fixed. In a second stage of the optimization, the first and second feature extractors may be updated using the estimated first and second surrogates.

The first stage of the optimization may be defined as follows for the first surrogate which is denoted by $q(y|x^A)$ $$Q_{i,y}^A := q(y|x_i^A).$$

$$\min_{Q^A} \mathbb{E}_{i \sim \mathcal{D}}\left[\mathbb{E}_{q(y|x_i^A)}[-\log p(y|x_i^B)]\right]$$

$$\text{s.t. } \mathbb{E}_{i \sim \mathcal{D}}[q(y|x_i^A)] = 1/K, \forall y.$$

where $Q^A$ is an (N×K) matrix, N is the number of data instances $x_i^A$ in the dataset $\mathcal{D}$, K is the number of class labels that y can have, $p(y|x_i^B)$ is the current estimate of the probability for $x_i^B$ that is paired with $x_i^A$ of the class label having a value of y. Similarly, the first stage of the optimization may be defined as follows for the second surrogate which is denoted by $q(y|x^B)$:

$$Q_{iy}^B := q(y|x_i^B).$$

$$\min_{Q^B} \mathbb{E}_{i\sim\mathcal{D}}\left[\mathbb{E}_{q(y|x_i^B)}[-\log p(y|x_i^A)]\right]$$

$$\text{s.t. } \mathbb{E}_{i\sim\mathcal{D}}[q(y|x_i^B)] = \frac{1}{K}, \forall y.$$

where $Q^B$ is an (N×K) matrix, N is the number of data instances $x_i^B$ in the dataset $\mathcal{D}$, K is the number of class labels that y can have, $p(y|x_i^A)$ is the current estimate of the probability of the class label having a value of y for $x_i^A$ that is paired with $x_i^B$. The first and second surrogates may also be denoted by $q^A$ and $q^B$, where we use the superscript to distinguish the two modalities.

Optimising the first stages may be achieved using a loss function which is augmented with an entropic regularizer. The augmented loss function may be expressed as followed for $q(y|x^A)$ and $q(y|x^B)$, respectively:

$$\frac{1}{\eta}\sum_{iy} Q_{iy}^A \log Q_{iy}^A$$

$$\frac{1}{\eta}\sum_{iy} Q_{iy}^B \log Q_{iy}^B$$

where $Q_{iy}^A$ and $Q_{iy}^B$ are the marginal constraints defined above and $\eta$ is the regularization trade-off hyperparameter. The augmented loss may be solved by the Sinkhorn-Knopp (SK) algorithm.

In an embodiment, evaluating the second feature extractor for the plurality of second data instances may comprise extracting a set of features for each of the evaluated second data instances. Similarly, evaluating the first feature extractor for the plurality of first data instances may comprise extracting a set of image features for each of the evaluated first data instances. Each of the plurality of first data instances and the plurality of second data instances may be termed a batch and are selected from the complete training dataset. The extracted features for each batch may be stored in a queue (e.g. a FIFO queue). The first stage of the optimization may be performed on the queued data. The second stage of the optimization may be performed on the optimised surrogate. It will be appreciated that when the data is separated into batches, the method comprises iterating each of the evaluating, assigning and training steps for the separate batches of data. As explained in more detail below, the use of batches and queues improves the efficiency of the optimization.

The second stage of the optimization may use a supervised loss minimisation function. For example, $$\min_{P,\phi^A,\phi^B} \mathcal{L}_s := \mathbb{E}_{i\sim\mathcal{D}}\left[\mathbb{E}_{q^A(y|x_i^A)}[-\log p(y|x_i^A)]\right] + \mathbb{E}_{i\sim\mathcal{D}}\left[\mathbb{E}_{q^B(y|x_i^B)}[-\log p(y|x_i^B)]\right]$$

where $P=\{p_1, \ldots, p_K\}$ are trainable parameters that are shared between the two modalities A and B, $\phi^A$ is the feature extractor for the modality A, $\phi^B$ is the feature extractor for the modality B, $q^A(y|x^A)$ and $q^B(y|x^B)$ are the surrogates for the first and second linear classifiers $p(y|x^A)$ and $p(y|x^B)$, y is the label and $x_i^A$ and $x_i^B$ is the ith elements for the two modalities in the dataset $\mathcal{D}$. When batches are used, this second stage of optimization may be done using the optimised surrogates which are determined using the batches.

When all batches have been processed, there may be a final optimization stage which may be a combination of different loss functions. For example, the final loss function may be:

$$\mathcal{L}(P,\phi^A,\phi^B) = \mathcal{L}_c(\phi^A,\phi^B) + \lambda \mathcal{L}_s(P,\phi^A,\phi^B), \quad (7)$$

where $\lambda$ is the trade-off hyperparameter, c is the contrastive loss, $\mathcal{L}_s$ ius the loss defined above, $P=\{p_1, \ldots, p_K\}$ are trainable parameters that are shared between the two modalities A and B, $\phi^A$ is the feature extractor for the modality A and $\phi^B$ is the feature extractor for the modality B. The contrastive loss element is optional. Alternatively, different loss functions may be used, e.g. the triplet loss function described below.

The model may be output to another device, e.g. an apparatus or user device, to use the trained model.

In an embodiment, there is provided a computer-implemented method for performing cross-modal retrieval using a trained machine learning, ML, model which has been trained as defined above. The cross-modal retrieval problem may be selected from text-based video retrieval, sketch-based image retrieval and image-text retrieval. Cross-model retrieval may comprise receiving an input from the first modality, evaluating, using the first feature extractor, the input to extract a set of features, selecting, using the extracted set of features, a matching output from the second modality, and outputting the selected matching output. For example, the input may be a sketch which is processed to identify the features therein and the output is an image which is the best match as determined by the model.

In an embodiment, there is provided an apparatus for performing cross-modal retrieval using a trained machine learning, ML, model which has been trained as defined above.

The apparatus may further comprise at least one image capture device for capturing images or videos to be processed by the ML model.

The apparatus may further comprise at least one interface for providing a result of the processing by the ML model to a user of the apparatus.

The apparatus may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, or a smart consumer device (such as a smart fridge). It will be understood that this is a non-exhaustive and non-limiting list of example apparatus.

In a related approach of the present techniques, there is provided a non-transitory data carrier carrying processor control code to implement the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog (RTM) or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The methods described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

BRIEF DESCRIPTION OF THE DRAWINGS

The above and other features, aspects, and advantages of certain embodiments of the present disclosure will be more apparent from the following detailed description, taken in conjunction with the accompanying drawings in which like characters represent like parts throughout the drawings, and in which:

FIG. 3B is a table showing the class labels from FIG. 3A assigned to each paired second data instance in the second modality;

DETAILED DESCRIPTION

Figure 1A:
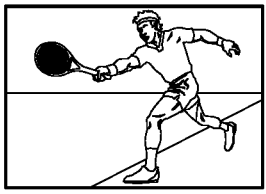
FIG. 1A is a representation of a typical image-caption (image-text) cross-modal retrieval problem.
Figure 1A:
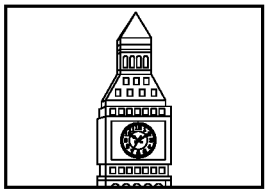
Figure 1A:
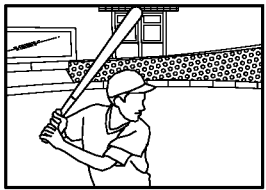
Figure 1A:
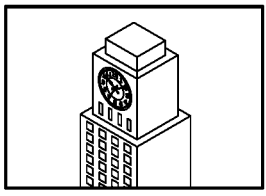

For the purpose of promoting an understanding of the principles of the disclosure, reference will now be made to various example embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are merely illustrative of the present disclosure and are not intended to be restrictive thereof.

Reference throughout this disclosure to "an aspect", "another aspect" or similar language may refer, for example, to a particular feature, structure, or characteristic described in connection with an embodiment being included in at least one embodiment of the present disclosure. Thus, appearances of the phrase "in an embodiment", "in another embodiment" and similar language throughout this disclosure may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

Broadly speaking, the present techniques generally relate to a method for training a machine learning, ML, model to perform real world cross-modal retrieval problems, and to a computer-implemented method and apparatus for performing real world cross-modal retrieval problems such as including text-based video retrieval, sketch-based image retrieval, and image-text retrieval using a trained machine learning, ML, model. The training method has a reduced sampling complexity and avoids the potentially wrong assumption that instances from different pairs are automatically irrelevant. The method finds similar instances from other pairs, and the feature extractor is trained in such a way that the same-class instances, even in different pairs, are well aligned.

As explained in more detail below, the method uses class prediction to learn the feature extractors, independently for each modality. The class prediction p can be expressed as $$Img: p(y|\phi_I(I))$$

$$Txt: p(y|\phi_T(T))$$

where $\phi_I$ is a first feature extractor for first data instances having a first modality (in this example images I having an image modality), $\phi_T$ is a second feature extractor for second data instances having a second modality (in this example, text captions T having a text modality) and y is a class label. In other words, each modality is independent and there are no pairwise terms which reduces the complexity to O(N).

FIG. 1A is a representation of a typical image-caption (image-text) cross-modal retrieval problem.

FIG. 1A is an example of such training data which comprises pairs of data (image, text) and is thus an example of the typical image-caption (image-text) cross-modal retrieval problem. Given the training data comprises image-text pairs, the goal is to learn the feature extractors; one for the image and one for the text such that features of image (I) and text (T) are close to each other if I and T are paired, and far apart otherwise. This can be expressed as:

$$Img: I \rightarrow \phi_I(I)$$

$$Txt: T \rightarrow \phi_T(T)$$

such that $\phi_I(I) \approx \phi_T(T)$ if (I, T) is paired, and vice versa where $\phi_I$ is the feature extractor for the images I and $\phi_T$ is the feature extractor for the text T.

In the cross-modal retrieval problem, the training is typically only supervised by the relevant multi-modal pairs in the data. The contrastive learning approach is the most popular approach for this task. The contrastive learning approach aims to learn the cross-modal similarity measure by the intuitive criteria that pull together relevant pairs and push away irrelevant ones. However, its sampling complexity for learning is quadratic in the number of training data points. Moreover, it makes potentially wrong assumption that the instances in different pairs are automatically irrelevant.

Figure 1B:
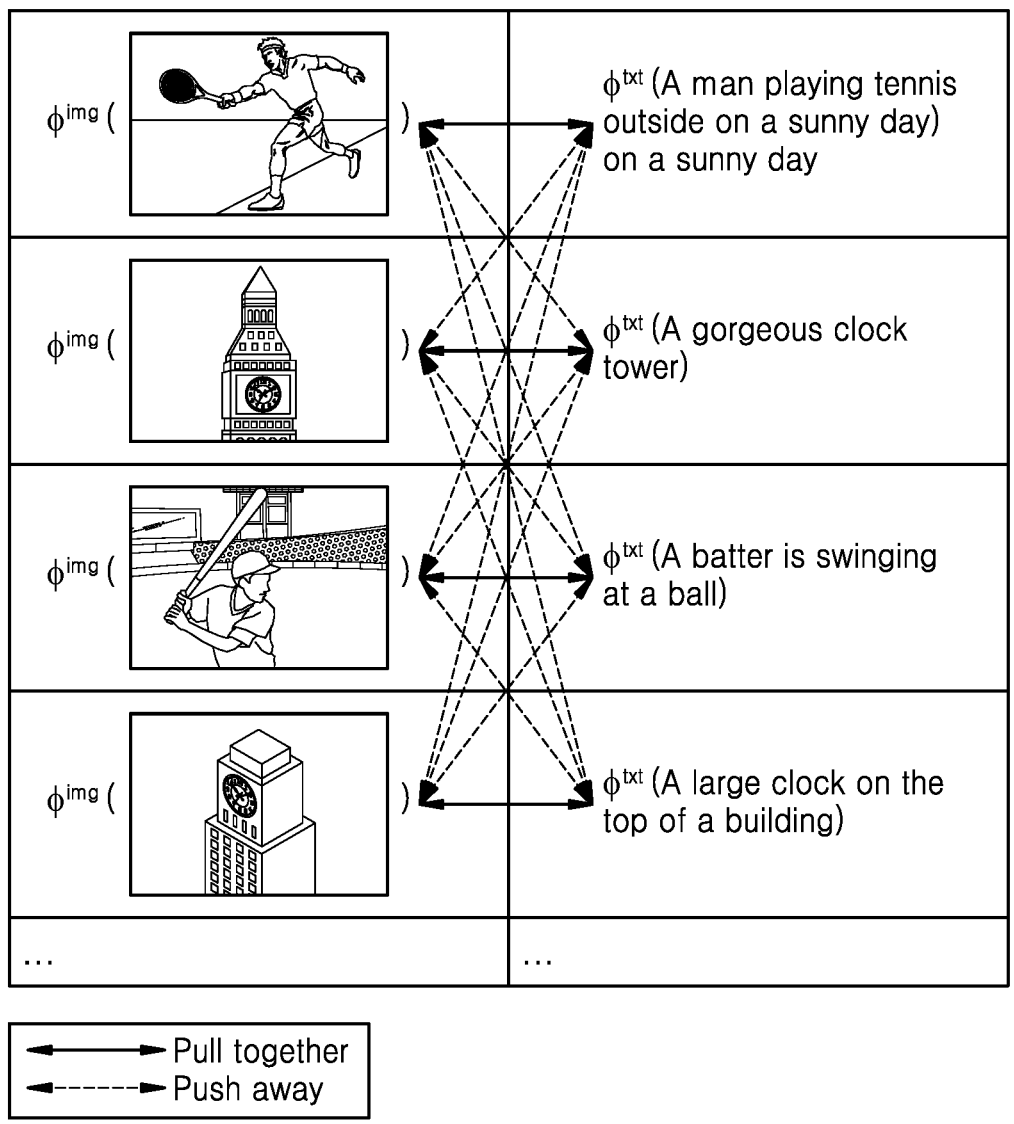
FIG. 1B is a schematic illustration of a prior art method for addressing the problem of FIG. 1A.

FIG. 1B is a schematic illustration of a prior art method for addressing the problem of FIG. 1A. The contrastive learning approach is illustrated in FIG. 1B. The relevant pairs are connected by the solid, horizontal lines and the irrelevant pairs by the dotted, angled lines. The contrastive learning approach has two major drawbacks: i) its pair-based loss requires quadratic sampling complexity in the number of training data points, and ii) it makes potentially wrong assumption that the instances in different pairs are automatically irrelevant. In other words, there are $O(N^2)$ or $O(N^3)$ pairwise terms which often require a large batch size. The pairs in the training data are usually collected by considering relevant pairs only (e.g., nearby image/text snippets in a web page), and the relevance of instances in different pairs is usually not checked. For example as illustrated in FIG. 1B, the examples in the second and fourth rows are in fact relevant, but pushed away in the contrastive learning. However, this is implicitly assumed in the contrastive loss.

Figure 2:
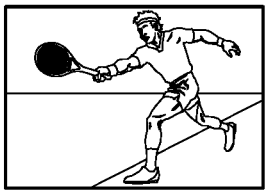
FIG. 2 is a schematic illustration of labels which may be applied to the paired data.
Figure 2:
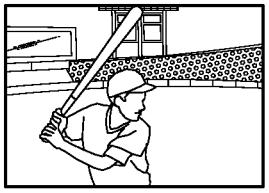
Figure 2:
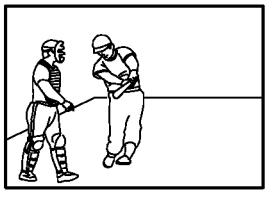
Figure 2:
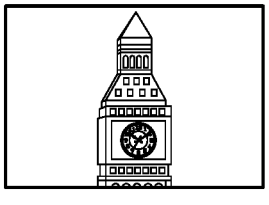
Figure 2:
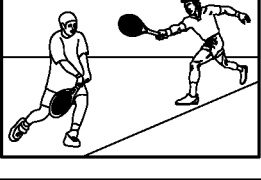
Figure 2:
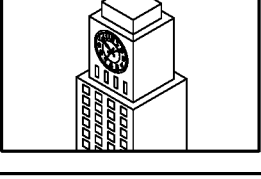

FIG. 2 is a schematic illustration of labels which may be applied to the paired data.

FIG. 2 illustrates examples of class labels (y=1, y=2, y=3) which may be applied to the example pairs shown in FIGS. 1A and 1B.

FIGS. 3A to 4B are schematic illustrations of the present method in which a novel loss function for cross-modal retrieval that is based on self-labeling of the unknown classes is used. As shown in both FIGS. 3A and 4A, (latent) semantic class labels such as those shown in FIG. 2 are predicted for data instances in a first modality. The class labels decide the relevance of cross-modal data instances (i.e., the same class label means relevant items, and vice versa). As shown in both FIGS. 3B and 4B, the predicted labels from the first modality are assigned to the corresponding instances in the other modality (i.e., swapping the pseudo labels). With these swapped pseudo labels, we learn the data embedding for each modality using the supervised cross-entropy loss, hence leading to linear sampling complexity.

Figure 3A:
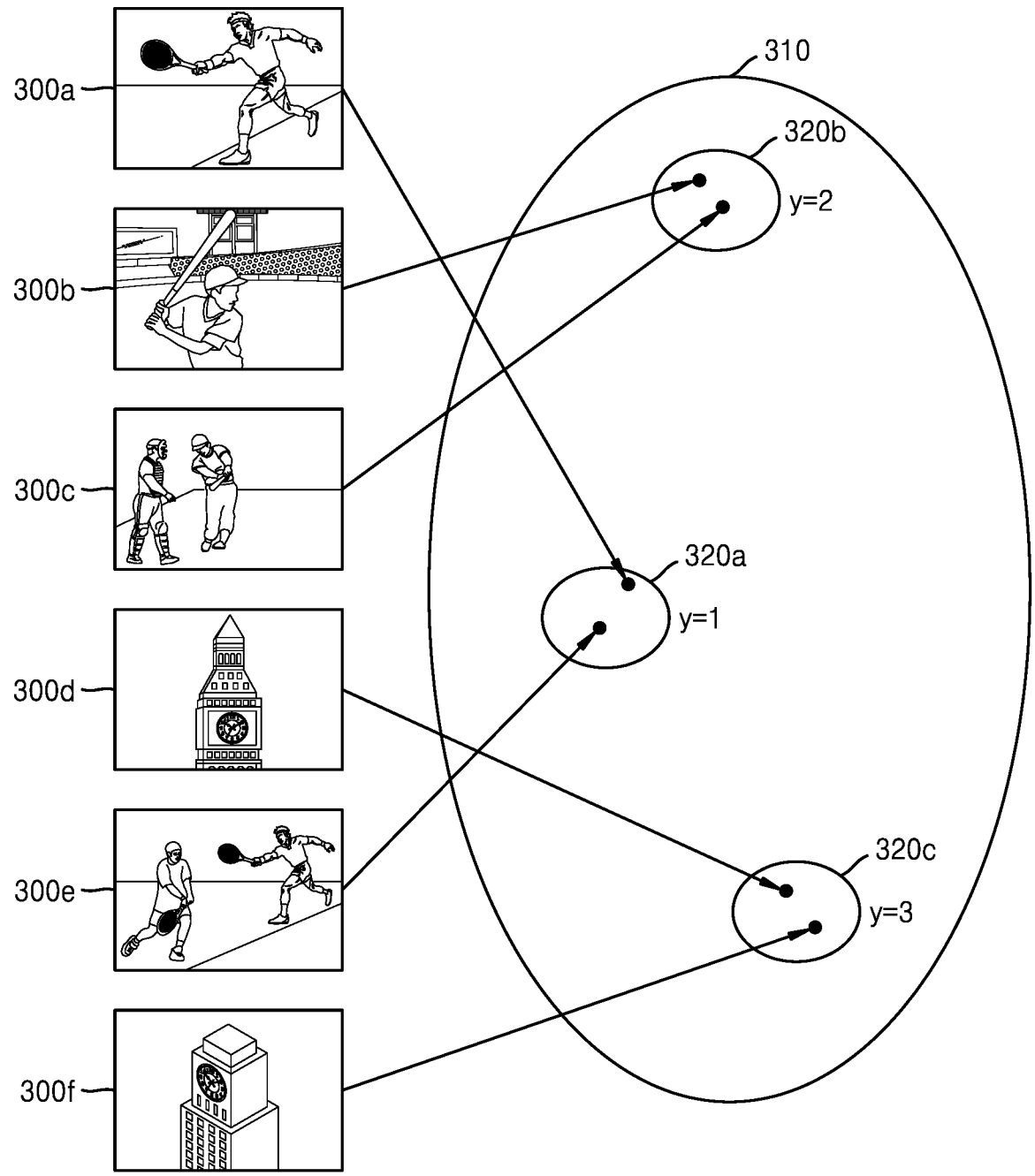
FIG. 3A is a schematic illustration of clustering predicted first data instances and assigning class labels to the first data instances in the clusters.

The whole process of label prediction and supervised learning with swapped classes is alternated to learn the optimal feature extraction networks. For example, as shown in FIG. 3A, we process the images $300a, \ldots, 300f$ to extract features in the images and form a feature space 310 which comprises feature representations of all the images. The features are usually outputs of the deep neural networks which are used to process the images. As shown in FIG. 3A, similar images such as the two images of tennis playing have representations in a similar area 320a of the feature space. Such an area in which the representations for multiple images are closely located may be termed a cluster. Additional clusters can be identified in the feature space, for example cluster 320b comprises the feature representations for both the baseball images and cluster 320c comprises the feature representations for both the clock tower images. It will be appreciated that six images is merely illustrative and there are typically significantly more images and more clustered data instances in modality A. As shown in FIG. 3A, each cluster is assigned its own class label which is given to all the data instances in the cluster.

The clusters may be identified using any suitable technique. The most traditional and popular clustering technique is known as K-means_clustering. and is described for example at https://en.wikipedia.org/wiki/K-means_clustering. K-means essentially seeks the best grouping (i.e. cluster) of data points that minimises the sums of distances between data points within the groups/clusters. Another known technique is to regard the (unknown) cluster labels as variables in an optimization problem, and solve them. The objective function of the optimization problem typically measures the similarity of cohesiveness of data points that belong to the same cluster labels. It is often called self-labelling. The method described in this application typically follows this latter approach, which is described in more detail in "Self-labelling via simultaneous clustering and representation learning" by Asano et al published in International Conference on Learning Representations in 2020.

Then as shown in FIG. 3B, the class labels from FIG. 3A are assigned to corresponding data in modality B (e.g., text). We can train the feature extractor for the text modality in a supervised manner, e.g. cross-entropy minimization. In other words, we learn:

$$\phi_T(T) \text{ via } CE \text{ loss:} -\log p(y|\phi_T(T))$$

where $\phi_T$ is a second feature extractor for second data instances T, p is the class prediction, and y is the assigned class label.

Figure 4A:
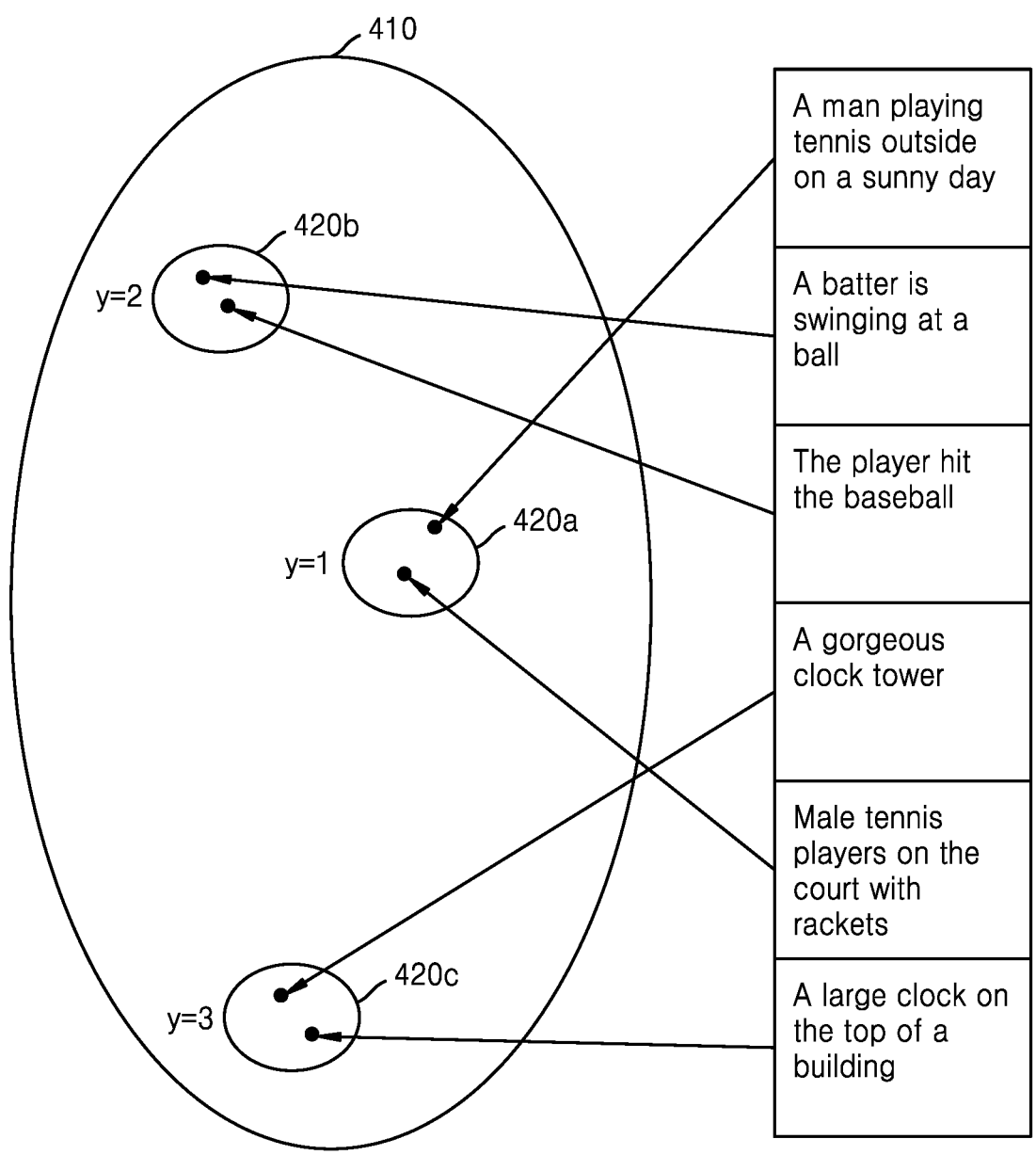
FIG. 4A is a schematic illustration of clustering predicted second data instances and assigning class labels to the second data instances in the clusters.
Figure 4B:
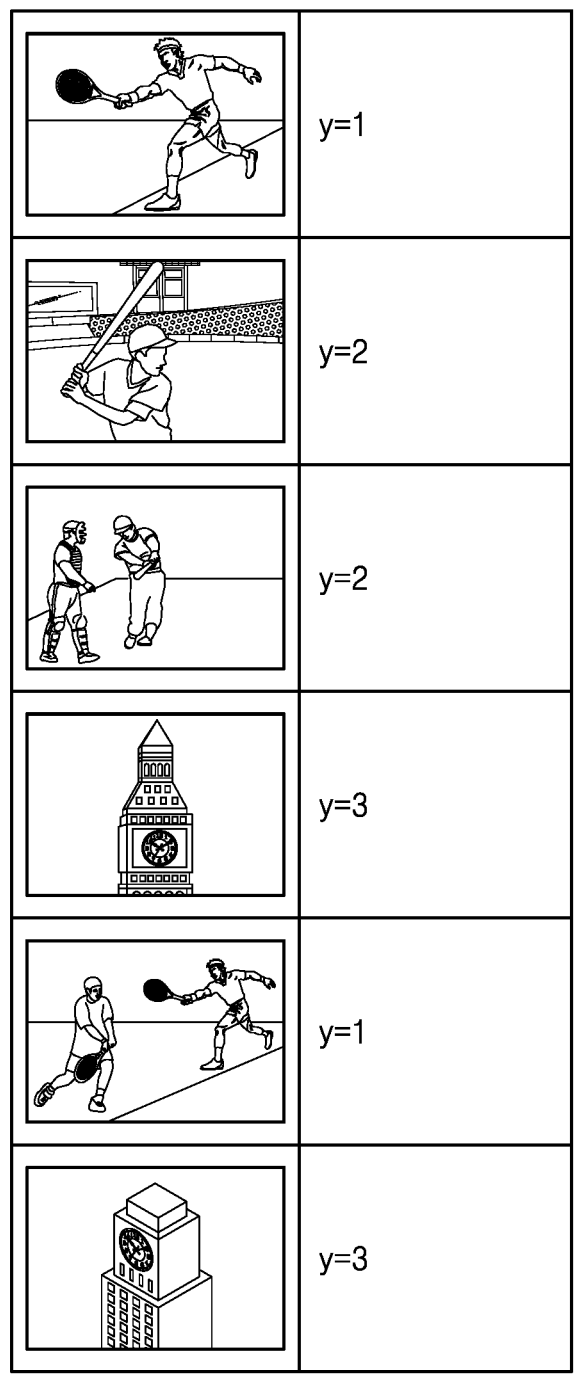
FIG. 4B is a table showing the class labels from FIG. 4A assigned to each paired first data instance in the first modality.

As shown in FIG. 4A, the feature space 410 for the second modality B (e.g. text) comprises three example clusters 420a, 420b, 420c. Class labels are assigned to data in each cluster. The feature space 410 is formed using $\phi_T$ which is the second feature extractor, in this example for the text modality. Then as shown in FIG. 4B, the class labels from FIG. 4A are assigned to corresponding data in modality A (e.g., image). We can train the feature extractor for the image modality in a supervised manner, e.g. cross-entropy minimization. In other words, we learn:

$$\phi_I(I) \text{ via } CE \text{ loss:} -\log p(y|\phi_I(I))$$

where $\phi_I$ is the first feature extractor for first data instances I, p is the class prediction, and y is the assigned class label. This approach which is schematically illustrated in FIGS. 3A to 4B may be termed Swapped Assignment of Multi-modal Pairs (SwAMP).

Figure 5:
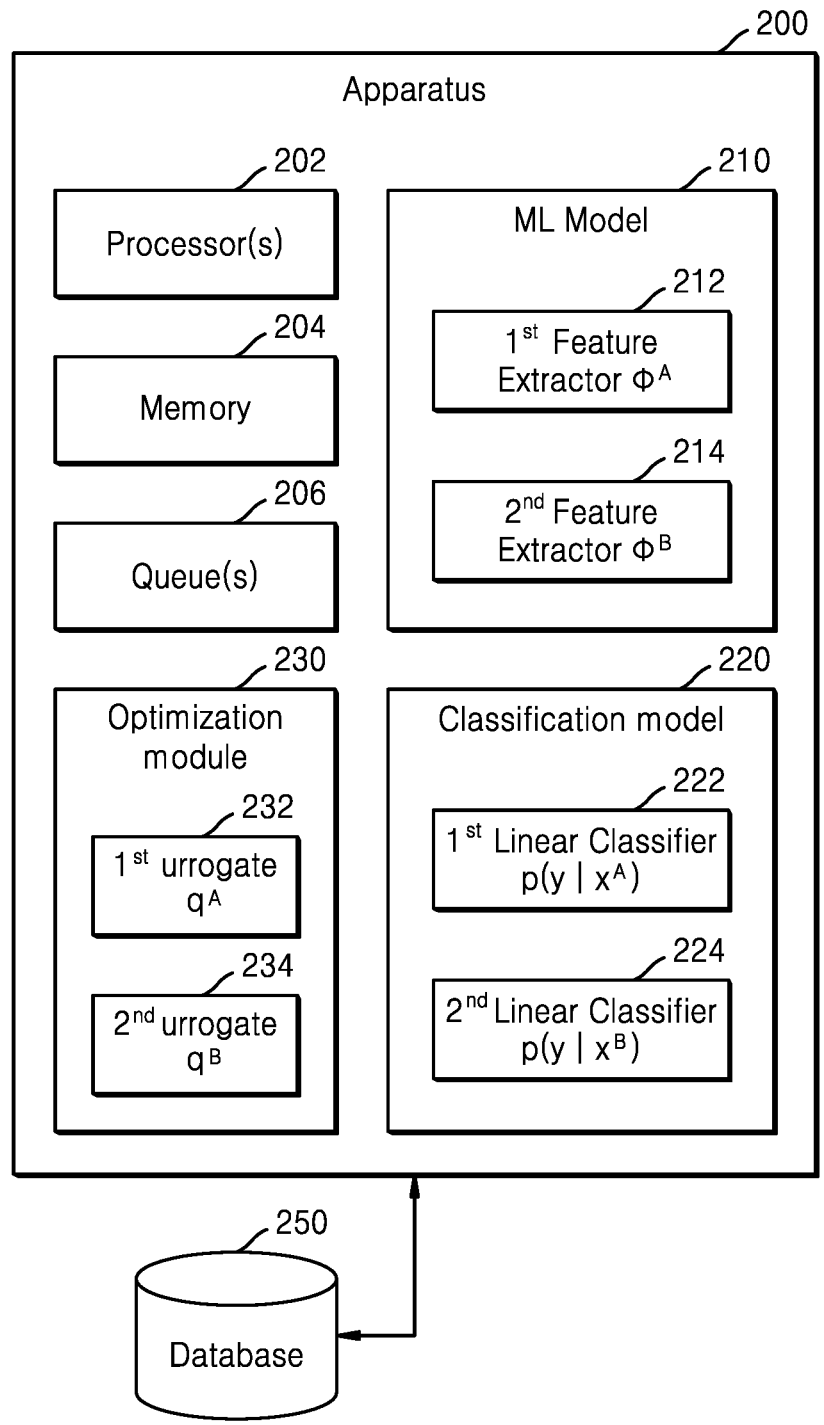
FIG. 5 is a block diagram of a system for training a machine learning model which incorporates the steps of FIGS. 3A to 4B.

FIG. 5 is a block diagram of an apparatus 200 for training a model using the SwAMP approach. The apparatus 200 may be a server, a computer or any suitable electronic device. It will be appreciated that the functionality of the apparatus 200 may be split across multiple devices. The apparatus comprises at least one processor 202 coupled to memory 204. The at least one processor 202 may comprise one or more of: a microprocessor, a microcontroller, and an integrated circuit. The memory 204 may comprise volatile memory, such as random access memory (RAM), for use as temporary memory, and/or non-volatile memory such as Flash, read only memory (ROM), or electrically erasable programmable ROM (EEPROM), for storing data, programs, or instructions. It will be appreciated that other standard components may also be present but these are omitted for clarity.

The apparatus 200 is connected to a database 250 which may be local or remote from (i.e. at a different location from) the apparatus 200. The database 250 may store training data which is used when training the machine learning model 210. The database 250 may also store the output from the training process, including for example the class labels, the trained machine learning model and intermediate data which is generated in the process of training, e.g. the surrogates described below.

The training data comprises data instances from modality A and modality B, which may be represented by $x^A$ and $x^B$, respectively. For instance, $x^A$ is an image from the image modality, while $x^B$ is a text/caption from the text modality. Throughout the description we deal with modality-wise feature representation, meaning that we have modality-wise feature extractors (neural networks) $\phi^A(\cdot)$ and $\phi^B(\cdot)$ applied to $x^A$ and $x^B$, respectively. Thus, as shown in FIG. 5, the machine learning model comprises a first feature extractor 212 $\phi^A$ which is applied to the first set of data instances $x^A$ to extract features therefrom and a second feature extractor 214 $\phi^B$ which is applied to the second set of data instances $x^B$ to extract features therefrom. Also known as dual encoders, the machine learning model thus produces a succinct vector $\mathbb{R}$ representation for each modality, $\phi^A(x^A) \in \mathbb{R}^d$ and $\phi^B(x^B) \in \mathbb{R}^d$. The shared feature $\mathbb{R}$ space ($\subset \mathbb{R}^d$) allows us to define the similarity as a cosine angle:

$$s(x^A, x^B) = \frac{\phi^A(x^A)^T \phi^B(x^B)}{\|\phi^A(x^A)\| \|\phi^B(x^B)\|}. \quad \text{Equation 1}$$

The goal is to learn the feature extractors so that the relevant pairs $x^A$ and $x^B$ have a high similarity score $s(x^A, x^B)$, while irrelevant pairs have a low similarity score. The main benefit of the modality-wise feature representation is the computational efficiency, scalable to billions of instances at training/test time, thanks to the efficient dot-product. $\mathcal{D}$ The training data are composed of relevant pairs $\mathcal{D} = \{(x_i^A, x_i^B)\}_{i=1}^N$, where $x_i^A$ and $x_i^B$ are the instances in the i-th relevant pair. At test time, a query is given from the query modality, say $x^A$, and the goal is to find the most relevant instance, say $x^B$, from the other modality, where the search is performed on the given test set $\{x_i^B\}_{i=N+1}^{N+M}$.

Our idea is to introduce (latent) semantic class labels for data instances and use them to learn the feature extractors. The class labels supposedly decide the relevance of data instances from different modalities, that is, $x^A$ and $x^B$ are considered relevant if their class labels are the same, and vice versa. Obviously, the paired cross-modal instances in the training data must have the same class labels. But beyond this, instances from different pairs can also be deemed relevant if they belong to the same semantic class labels. The motivation is that if we estimate the class labels accurately, the feature extractor learning can be turned into a supervised classification problem of linear sampling complexity.

More formally, we consider (unknown) class labels to be assigned to the data instances. $y^A, Y^B \in \{1, \ldots, K\}$ are assigned as the class labels for $x^A$ and $x^B$, respectively, where K is chosen by the user. The relevance of $x^A$ and $x^B$ is determined by their class labels: $x^A$ and $x^B$ are deemed relevant if $y^A = y^B$ and irrelevant if $y^A \neq y^B$. It is noted that if the class labels that bear such semantics were known in the training data, then training becomes supervised learning that can be done for each modality. Such supervised learning would allow us to avoid pairwise terms in the loss function, leading to linear sampling complexity. However, the class labels are not known, and thus it necessary to optimize them (i.e., using self-supervised learning) together with the feature extractors $\phi^A(\cdot)$ and $\phi^B(\cdot)$.

As shown in FIG. 5, the self-supervised learning is achieved by using a classification model comprising first and second linear classifiers 222, 224. These first and second linear classifiers $p(y|x^A)$ and $p(y|x^B)$ are built on the extracted features and may be defined as, $$p(y = j | x^M) = \frac{\exp(p_j^T \phi^M(x)/\tau)}{\sum_l \exp(p_l^T \phi^M(x)/\tau)}, M \in \{A, B\} \quad \text{Equation 2}$$

where $P = \{P_1, \ldots, P_K\}$ are trainable parameters that are shared between the two modalities, $\phi^M$ is the feature extractor, $x^M$ is the data instance, y is the class label for class j, each $p_j$ may be regarded as the prototype vector for class j that lies in the shared feature space, and $\tau$ is the temperature in the softmax. The softmax function is a well known term of art which is a smooth approximation to the arg max function and may also be termed the normalized exponential function. Using the softmax function may be beneficial when compared to the argmax function because the objective remains differentiable, allowing gradient backpropagation to be used to update the model parameters. The softmax function can be used to convert values into probabilities and in this case, the value $p_j^T \phi^M(x)$ corresponds to the expected class label after evaluating $\phi^M(x)$. The temperature ($\tau$) has the impact of highlighting or attenuating the current model's decision score ($p_j^T \phi^M(x)$) on class prediction. Properly choosing $\tau$ is important because if $\tau$ is too large, then model's current class label prediction would be unused (ignored) in training; if $\tau$ is too small, we would rely too much on model's current decision which might be incorrect at early training stage, potentially leading to an inaccurate retrieval model.

As shown in FIG. 5, there is an optimization module 206 for optimizing the linear classifiers in the classification models. The (supervised) cross-entropy loss minimization may be considered a natural choice to optimize the linear classifiers of the classification models. Cross-entropy loss is a very well-known technique for deep learning and is described for example in textbooks such as "Machine Learning: A Probabilistic Perspective" by Kevin Murphy. Such an optimization may include letting $P_{true}(y|x^A)$ be the true conditional class distribution for modality A, minimizing $\mathbb{E}_{p_{true}(y|x^A)}[-\log p(y|x^A)]$ with respect to the trainable parameters P and the network parameters of $\phi^A(\cdot)$ (similarly for modality B). There is no access to $p_{true}(y|x^A)$, and thus one may be tempted to use the model for the first linear classifier $p(y|x^A)$ in (2) instead. However, it can easily lead to a degenerate solution such as the one that puts all the probability mass on a particular single class all the time (thus attaining the optimal cross-entropy loss 0). Moreover, this would make learning $\phi^A(\cdot)$ and $\phi^B(\cdot)$ nearly independent and less interacted with each other, merely through the shared trainable parameters P.

Instead of using cross-entropy loss minimization, the optimization module 206 may use a different technique which includes using first and second surrogates 232, 234 for the first and second linear classifiers. An optimization problem is formed to estimate a first surrogate 232 which is an estimate of the true conditional class distribution for modality A, $P_{true}(y|x^A)$, and a second surrogate 234 which is an estimate of the true conditional class distribution for modality B, $P_{true}(y|x^B)$. The first surrogate 232 is denoted by $q(y|x^A)$ and the second surrogate 234 is denoted by $q(y|x^B)$. The first surrogate 232 is estimated using the information from the other (second) modality B, while imposing additional constraints to avoid the degenerate solutions. Similarly, the second surrogate 234 is estimated using the information from the other (first) modality A, while imposing additional constraints to avoid the degenerate solutions.

More specifically, we optimize the first and second surrogates with the following two criteria. First, each surrogate for the class distribution for one modality needs to be well aligned with the current estimate for the linear classifier in the other modality for each paired data instance. In other words, $q(y|x^A)$ needs to be well aligned with the current estimate of $p(y|x^B)$ for $x^B$ that is paired with $x^A$ and similarly, $q(y|x^B)$ needs to be well aligned with the current estimate of $p(y|x^A)$ for $x^A$ that is paired with $x^B$. This is due to the aforementioned requirements for the class labels, where the class labels (more generally, their distributions) of the paired instances should match. Secondly, the marginal distribution $q(y) = \mathbb{E}_{x^A \sim \mathcal{D}}[q(y|x^A)]$ or $q(y) = \mathbb{E}_{x^B \sim \mathcal{D}}[q(y|x^B)]$ is constrained to be a uniform distribution. This constraint naturally arises from the symmetry of class labels, a reasonable assumption about the true class distribution, and successfully leaves out the degenerate solutions discussed above.

To summarize, the following is the optimization problem for the surrogate $q(y|x^A)$, $$Q_{iy}^A := q(y|x_i^A). \qquad \text{Equation 3}$$

$$\min_{Q^A} \mathbb{E}_{i \sim \mathcal{D}} \left[ E_{q(y|x_i^A)}[-\log p(y|x_i^B)] \right]$$

$$s.t. \; \mathbb{E}_{i \sim \mathcal{D}}[q(y|x_i^A)] = 1/K, \; \forall y.$$

where $Q^A$ is an (N×K) matrix, N is the number of data instances $x_i^A$ in the dataset $\mathcal{D}$, K is the number of class labels y, $p(y|x_i^B)$ is the current estimate of the probability for $x_i^B$ that is paired with $x_i^A$ of the class label having a value of j.

We perform the similar optimization for the surrogate $q(y|x^B)$ to approximate $P_{true}(y|x^B)$ by exchanging the roles of A and B. In other words, $$Q_{iy}^B := q(y|x_i^B). \qquad \text{Equation 4}$$

$$\min_{Q^B} \mathbb{E}_{i \sim \mathcal{D}} \left[ E_{q(y|x_i^B)}[-\log p(y|x_i^A)] \right]$$

$$s.t. \; \mathbb{E}_{i \sim \mathcal{D}}[q(y|x_i^B)] = \frac{1}{K}, \; \forall y.$$

where $Q^B$ is an (N×K) matrix, N is the number of data instances $x_i^B$ in the dataset $\mathcal{D}$, K is the number of class labels y, $p(y|x^A)$ is the current estimate of the probability of the class label having a value of j for $x_i^A$ that is paired with $x_i^B$ The optimal solutions (surrogates) are denoted by $q^A$ and $q^B$, where we use the superscript to distinguish the two modalities. Note that during the optimization of (3) for $q^A$ and the optimization of (4) for $q^B$, we fix the model parameters, that is, P and the feature extractor networks. Hence the overall optimization is alternation between: i) the surrogate optimizations (3) and (4) with P, $\phi^A$, $\phi^B$ fixed, and ii) the supervised (cross-entropy) loss minimization with $q^A$ and $q^B$ fixed. The supervised loss minimization $\mathcal{L}_s$, can be written as (subscript s stands for SwAMP):

$$\min_{P, \phi^A, \phi^B} \mathcal{L}_s := \mathbb{E}_{i \sim \mathcal{D}}\left[\mathbb{E}_{q^A(y|x_i^A)}[-\log p(y|x_i^A)]\right] + \qquad \text{Equation 5}$$

$$\mathbb{E}_{i \sim \mathcal{D}}\left[\mathbb{E}_{q^B(y|x_i^B)}[-\log p(y|x_i^B)]\right]$$

where $P = \{p_1, \ldots, p_K\}$ are trainable parameters that are shared between the two modalities A and B, $\phi^A$ is the feature extractor for the modality A, $\phi^B$ is the feature extractor for the modality B, $q^A(y|x^A)$ and $q^B(y|x^B)$ are the surrogates for the first and second linear classifiers $p(y|x^A)$ and $p(y|x^B)$, y is the label and $x_i^A$ and $x_i^B$ is the ith elements for the two modalities in the dataset $\mathcal{D}$.

Optimizing (3) and (4) may be achieved by a variation of the optimal transport (OT) problem which is described for example in "Optimal Transport: Old and New" by Villiani published by Springer in 2008. For optimizing (3) and (4), the cost matrices may be expressed as $$C_{iy} = -\log p(y|x_i^B) \text{ and}$$

$$C_{iy} = -\log p(y|x_i^A)$$

The marginal constraints may be expressed as $$\Sigma_i Q_{iy}^A = 1/L, \forall y (\text{and implicitly } \Sigma_y Q_{iy}^A = 1/N, \forall i \in \mathcal{D})$$

$$\Sigma_i Q_{iy}^B = 1/L, \forall y (\text{and implicitly } \Sigma_y Q_{iy}^B = 1/N, \forall i \in \mathcal{D})$$

Although the OT is known to be an instance of the linear program (LP), conventional LP solvers are not suitable for large-scale problems. As is common practice, we relax the problem by augmenting the loss with the entropic regularizer which are added to the loss (thus, penalizing small entropy). The augmented loss may be expressed as followed for $q(y|x^A)$ and $q(y|x^B)$, respectively:

$$\frac{1}{\eta} \sum_{iy} Q_{iy}^A \log Q_{iy}^A$$

$$\frac{1}{\eta} \sum_{iy} Q_{iy}^B \log Q_{iy}^B$$

where $Q_{iy}^A$ and $Q_{iy}^B$ are the marginal constraints defined above and $\eta$ is the regularization trade-off hyperparameter.

The augmented loss may be solved by the efficient Sinkhorn-Knopp (SK) algorithm which is described for example in "Sinkhorn Distances: Lightspeed Computation of Optimal Transportation Distances" by Cuturi published in Advances in Neural Information Processing Systems in 2013. Here $\eta$ is the regularization trade-off hyperparameter. The SK algorithm finds the optimal solutions as $$Q^A = \text{Diag}(u) A \text{Diag}(v) \text{ and } Q^B = \text{Diag}(u) B \text{Diag}(v)$$

where $A_{iy} = e^{-\eta C_{iy}}$ and the vectors $u \in \mathbb{R}_+^N$ and $v \in \mathbb{R}_+^K$ are the fixed points of $$u_i = \frac{1}{N}/(A\nu)_i \text{ for } i = 1, \ldots, N$$

$$v_j = \frac{1}{K}/(A^T u)_j \text{ for } j = 1, \ldots, K$$

and similarly where $B_{iy} = e^{-\eta C_{iy}}$ and the vectors $u \in \mathbb{R}_+^N$ and $v \in \mathbb{R}_+^K$ are the fixed points of $$u_i = \frac{1}{N}/(B\nu)_i \text{ for } i = 1, \ldots, N$$

$$v_j = \frac{1}{K}/(B^T u)_j \text{ for } j = 1, \ldots, K.$$

The fixed point iteration usually converges quickly after a few iterations. We denote the algorithm as:

$$Q \leftarrow SK(\text{cost}=C, \text{reg}=\eta). \qquad \text{Equation 6}$$

Figure 9A:
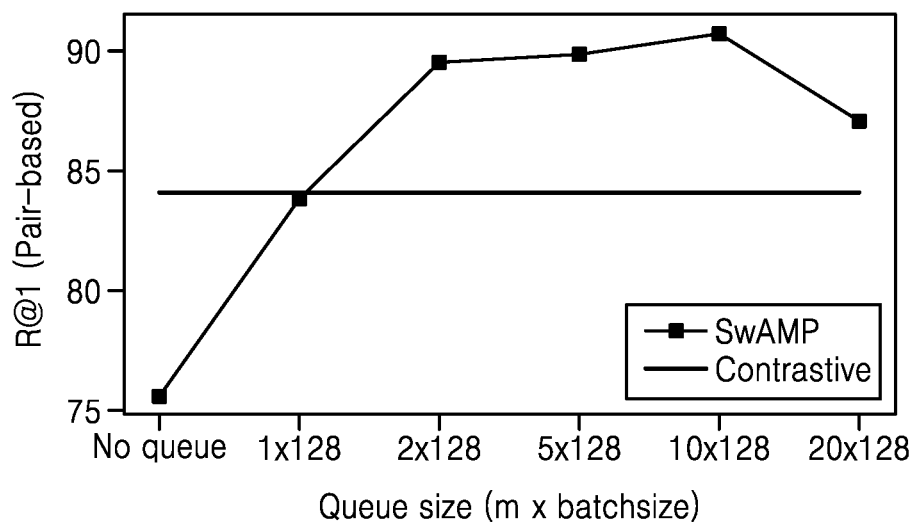
FIGS. 9A and 9B plot the variation in percentage of the true item found as the top retrieved item against queue size for the SwAMP method compared with the contrastive loss method using pair-based error types and class-based error types respectively.
Figure 9B:
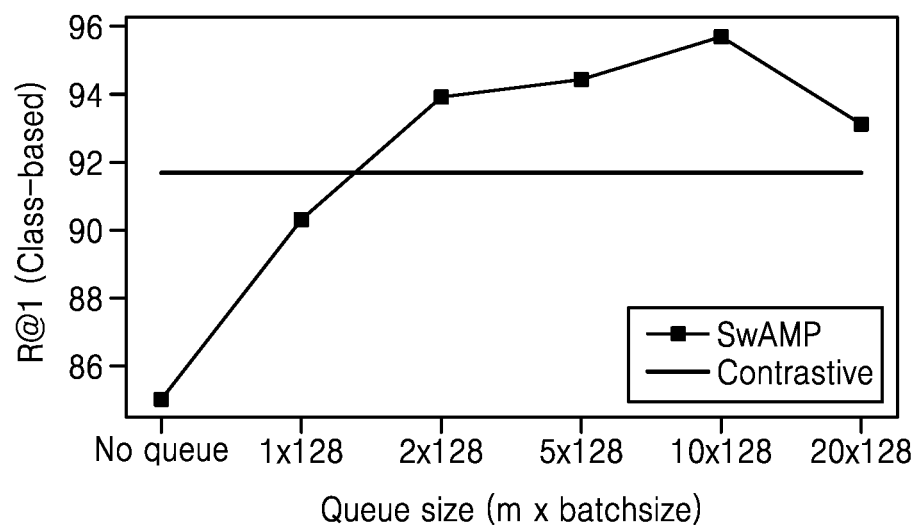

One challenge in optimizing (3) and (4) with the SK, however, is that it involves the entire dataset $\mathcal{D}$ in the loss, which means that the second part of the overall optimization defined in (5) has to be deferred until $q^A$ and $q^B$ are optimized for an entire data epoch. Simply replacing $\mathcal{D}$ with a minibatch might be dangerous since the population class marginal distributions are poorly covered by a minibatch. We need an even larger subset of $\mathcal{D}$ to roughly meet the (uniform) class constraint. To this end, we adopt the (FIFO) queues 206 shown in FIG. 5, where we accumulate the embeddings $\phi^A(x^A)$ and $\phi^B(x^B)$ from the latest minibatches into the queues. The optimization (3) and (4) is then performed on the queue data ($\mathcal{D}$ replaced by the data in the queues). To have the uniform class constraint meaningful, we choose the queue size to be greater than K. Note that (3) and (4) is solved by the SK algorithm, and thus no back-propagation is required, hence enlarging the queue size does not incur any computational issue. The impact of the queue size is shown in FIGS. 9A and 9B and described below. Further implementation details can also be found in "Momentum Contrast for Unsupervised Visual Representation Learning" by He et al published in preprint arXiv: 1911.05722 in 2019 and "Unsupervised Learning of Visual Features by Contrasting Cluster Assignments" by Caron et al published in Advances in Neural Information Processing Systems in 2020 which use similar ideas.

To have the queues 206 filled with the latest features, we insert the features of the current minibatch into the queues 206, then perform the SK algorithm. Once (3) and (4) are done, we can optimize (5) by gradient descent, but only the current minibatch portion of q is used. The final loss function may be a combination of the SwAMP loss and contrastive loss:

$$\mathcal{L}(P, \phi^A, \phi^B) = \mathcal{L}_c(\phi^A, \phi^B) + \lambda \mathcal{L}_s(P, \phi^A, \phi^B), \qquad \text{Equation 7}$$

where $\lambda$ is the trade-off hyperparameter, $\mathcal{L}_c$ is the contrastive loss, $\mathcal{L}_s$ ius the SwAMP loss defined in (5), $P = \{p_1, \ldots, p_K\}$ are trainable parameters that are shared between the two modalities A and B, $\phi^A$ is the feature extractor for the modality A and $\phi^B$ is the feature extractor for the modality B.

The contrastive (or triplet loss) learning is described for example in "Learning a similarity metric discriminatively, with application to face verification" by Chopra et al published in IEEE Conference on Computer Vision and Pattern Recognition in 2005 and "Dimensionality Reduction by Learning an Invariant Mapping" by Hadsell et al published in IEEE Conference on Computer Vision and Pattern Recognition in 2006. The loss function penalizes small similarity scores for relevant pairs, and penalizes large similarity scores for irrelevant pairs. With the introduction of the margin and considering the most violating irrelevant pairs (i.e., hard negative mining), the loss $\mathcal{L}_c$ can be formally written as (subscript c stands for contrastive):

$$\mathcal{L}_C(\phi^A, \phi^B) = \qquad \text{Equation 8}$$

$$\sum_{i \in \mathcal{D}} \left( s(x_i^A, x_i^B) - \max_{j \in \mathcal{D} \setminus i} s(x_j^A, x_i^B) \right)_{\geq \alpha} + \left( s(x_i^A, x_i^B) - \max_{j \in \mathcal{D} \setminus i} s(x_j^A, x_i^B) \right)_{\geq \alpha}$$

where $(z)_{\geq a} = \max(0, a-z)$ only incurs positive loss when $z < a$, $a$ is the margin (e.g., 0.2), $s(x_i^A, x_i^B)$ is the similarity between the ith data instances in the modalities A and B.

As explained above, the surrogate $q^A$ is estimated using the current classification model in modality B, and vice versa, so the class assignment is swapped. Therefore we name this approach SwAMP (Swapped Assignment of Multi-modal Pairs). The pseudo code of the SwAMP is described in the algorithm shown below.

Input: Class cardinality K, queue size, softmax temperature $\tau$, regularizer trade-off $\eta$ in SK.

Initialize: Prototypes P and $\phi^A(\cdot)$, $\phi^B(\cdot)$. Empty the queue Q.

Output: Trained model $\{P, \phi^A(\cdot), \phi^B(\cdot)\}$.

Repeat:
1. Sample a minibatch of paired data $\mathcal{B} = \{(x_i^A, x_i^B)\}$.
2. Evaluate $\phi^A(x_i^A)$ and $\phi^B(x_i^B)$ for $i \in \mathcal{B}$ (forward pass).
3. Insert $\{(\phi^A(x_i^A), \phi^B(x_i^B))\}_{i \in \mathcal{B}}$ into the queue Q.
4. Solve (3) & (4) for modality A and B:

$$\{q^A(y|i)\}_{i \in Q} \leftarrow SK(\text{cost} = \{-\log p(y|x_i^B)\}_{i \in Q}, \text{reg} = \eta).$$

$$\{q^B(y|i)\}_{i \in Q} \leftarrow SK(\text{cost} = \{-\log p(y|x_i^A)\}_{i \in Q}, \text{reg} = \eta).$$

5. Take the minibatch portions $\{q^A(y|i), q^B(y|i)\}_{i \in \mathcal{B}}$, and do one SGD update with $\mathcal{L}$ in (7).

Figure 6:
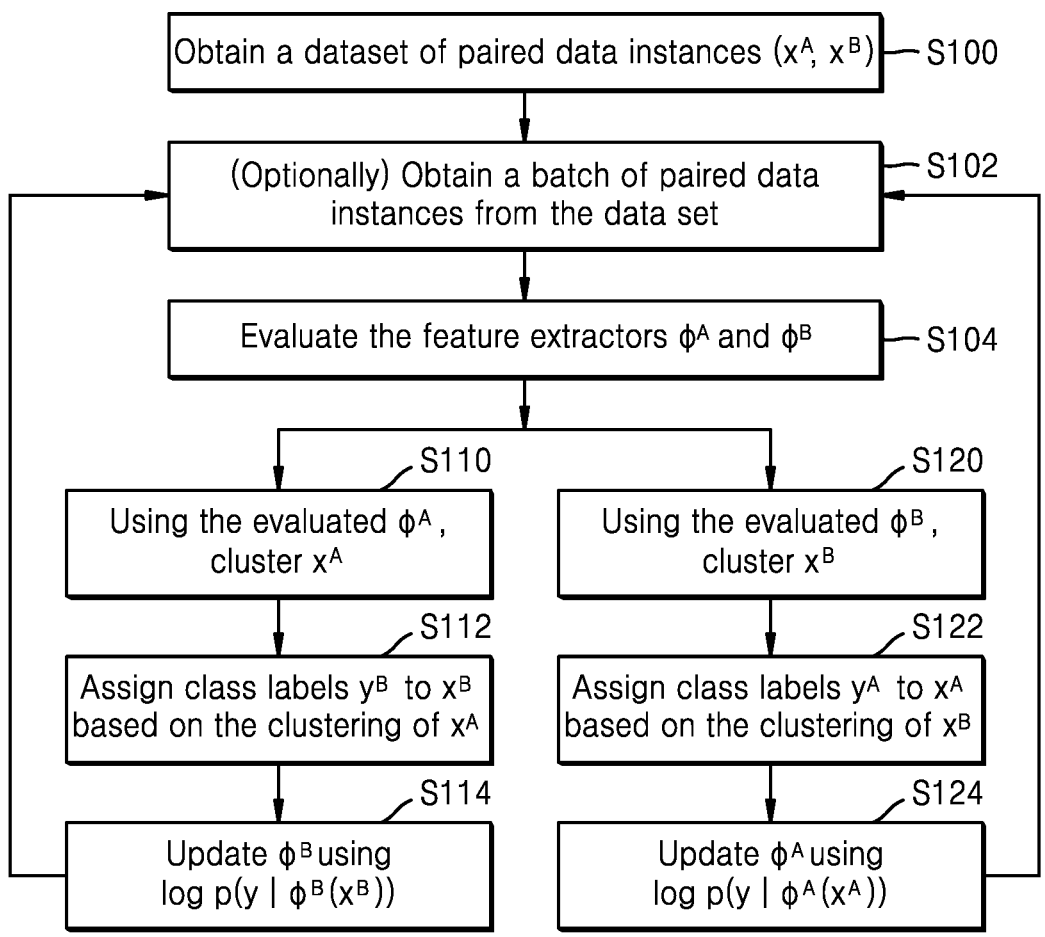
FIG. 6 is a flowchart illustrating the method of swapped assignment of multi-modal pairs (SwAMP) for cross-modal retrieval which incorporates the steps of FIGS. 3A to 4B.

FIG. 6 schematically illustrates the steps which may be applied in the process. In a first step, the training data comprising a plurality of paired data instances $\mathcal{D} = \{(x_i^A, x_i^B)\}_{i=1}^N$ is obtained (step S100). As illustrated in the pseudo code and as explained above, the entire dataset may be processed in batches and thus there is an optional step of obtaining a batch of paired data instances from the data set (step S102). In a forward pass of the machine learning model, the feature extractors $\phi^A(x^A)$ and $\phi^B(x^B)$ are evaluated for the data (i.e. for the batch of data where batches are being used) at step S104. Evaluating the feature extractors may comprise calculating a prototype attention representation (PAR) as described in more detail below.

Evaluating the data means that the features are extracted using the appropriate feature extractor. The data in modality A may be a single image or a set of images forming a video. Evaluating the data in modality A thus comprises processing the image to identify features therein and a feature space such as the feature space 310 shown in FIG. 3A is formed. As described in more detail in the examples below, for a video, the features may be a concatenation of frame-level and video-level features extracted from the pretrained 2D/3D CNNs. The features may be extracted using any suitable techniques, e.g. the ImageNet pre-trained Resnet-152 for 2D features and the pre-trained ResNeXt-101

16-frame model for 3D features. Evaluating the data in modality B thus comprises processing the text/image to identify features therein and a feature space such as the feature space 410 shown in FIG. 4A is formed. For example, the text features may be any suitable features such as the GoogleNews pre-trained word2vec embeddings. For a single image in either modality and as described in the image-text retrieval example below, the features may be as described in the "Stacked Cross Attention for Image-Text Matching" by Lee et al published in European Conference on Computer Vision in 2018. The data in modality B may be text or may be an image (for the cross-modal problem of retrieving an image based on an input sketch).

Figure 8A:
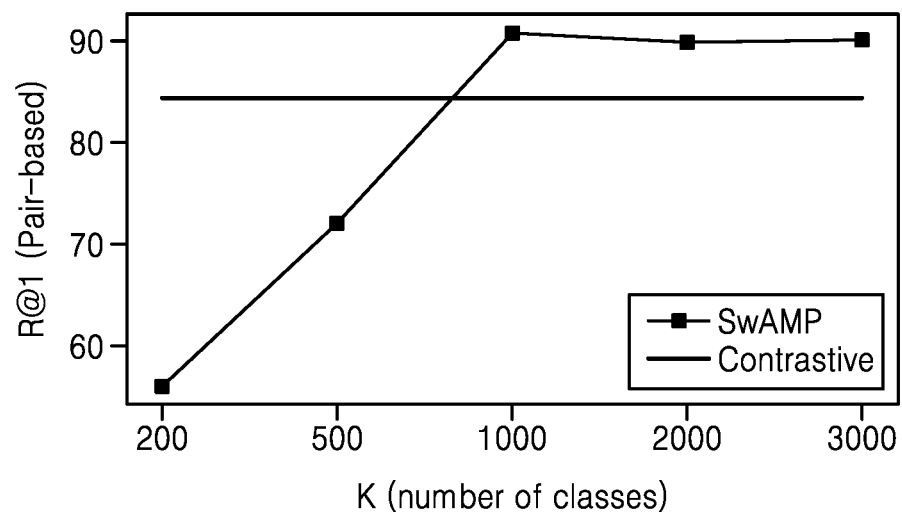
FIG. 8A plots the variation in percentage of the true item (R) found as the top retrieved item against number of classes for the SwAMP method compared with the contrastive loss method using pair-based error types.
Figure 8B:
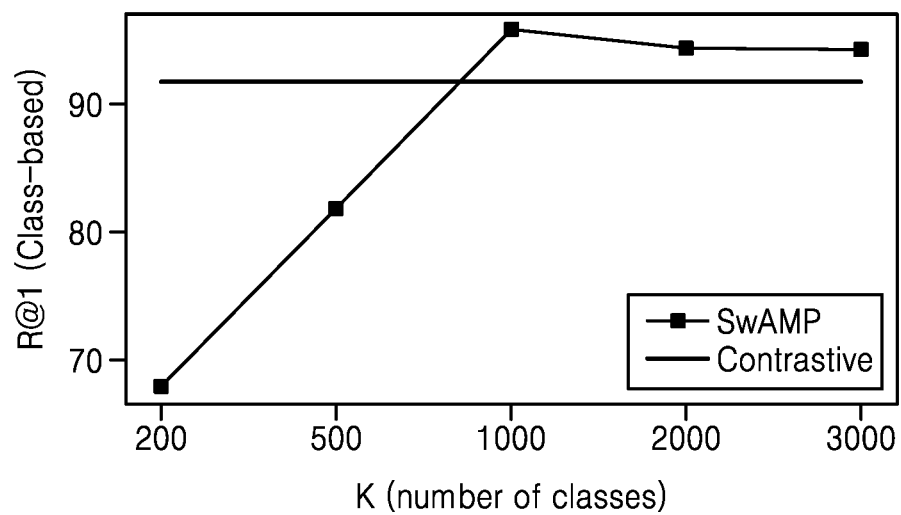
FIG. 8B plots the variation in percentage of the true item found as the top retrieved item against number of classes for the SwAMP method compared with the contrastive loss method using class-based error types.

Using the evaluations, it is possible to cluster the evaluated data in each modality which is shown in the separate branches and then update the feature extractor for the other modality. Thus at step S110, the data $x^A$ in the first modality (A) is clustered using the feature representations for the data evaluated by the corresponding feature extractor $\phi^A$. Each cluster is assigned a class label $y^A$. Based on the clustering for the data $x^A$ in the first modality and the class label for each cluster, class labels $y^B$ are assigned to the data $x^B$ in the second modality (B) at step S112. In other words, as shown in FIG. 3B, the same label which is assigned to an ith data instance $x_i^A$ in the first modality is assigned to the paired data instance $x_i^B$ in the second modality. As explained above, the number of labels (and hence the number of clusters) can be selected by the user. The impact of the number of labels is shown in FIGS. 8A and 8B. The next step is to update the feature extractor $\phi^B$ for the second modality (B) at step S114.

In a similar manner, at step S120, the data $x^B$ in the second modality (B) is clustered using the feature representations for the data evaluated by the corresponding feature extractor $\phi^B$. Based on the clustering for the data $x^B$, class labels $y^A$ are assigned to the data $x^A$ in the first modality (A) at step S122. As explained above, the number of labels can be selected by the user and may be the same or different to the number of labels used in step S112. The next step is to update the feature extractor $\phi^A$ for the first modality (A) at step S124.

After the feature extractors have been updated in steps S114, S124, the method loops back to perform an iterative update, e.g. using a different batch where batches are being used. FIG. 6 illustrates steps S110 to S114 being performed in parallel to steps S120 to S124 but steps S120 to S124 may be performed after step S110 to S114 or vice versa. The updating step S114 and S124 may be performed using the optimization method described above which uses cross-entropy loss.

Figure 7:
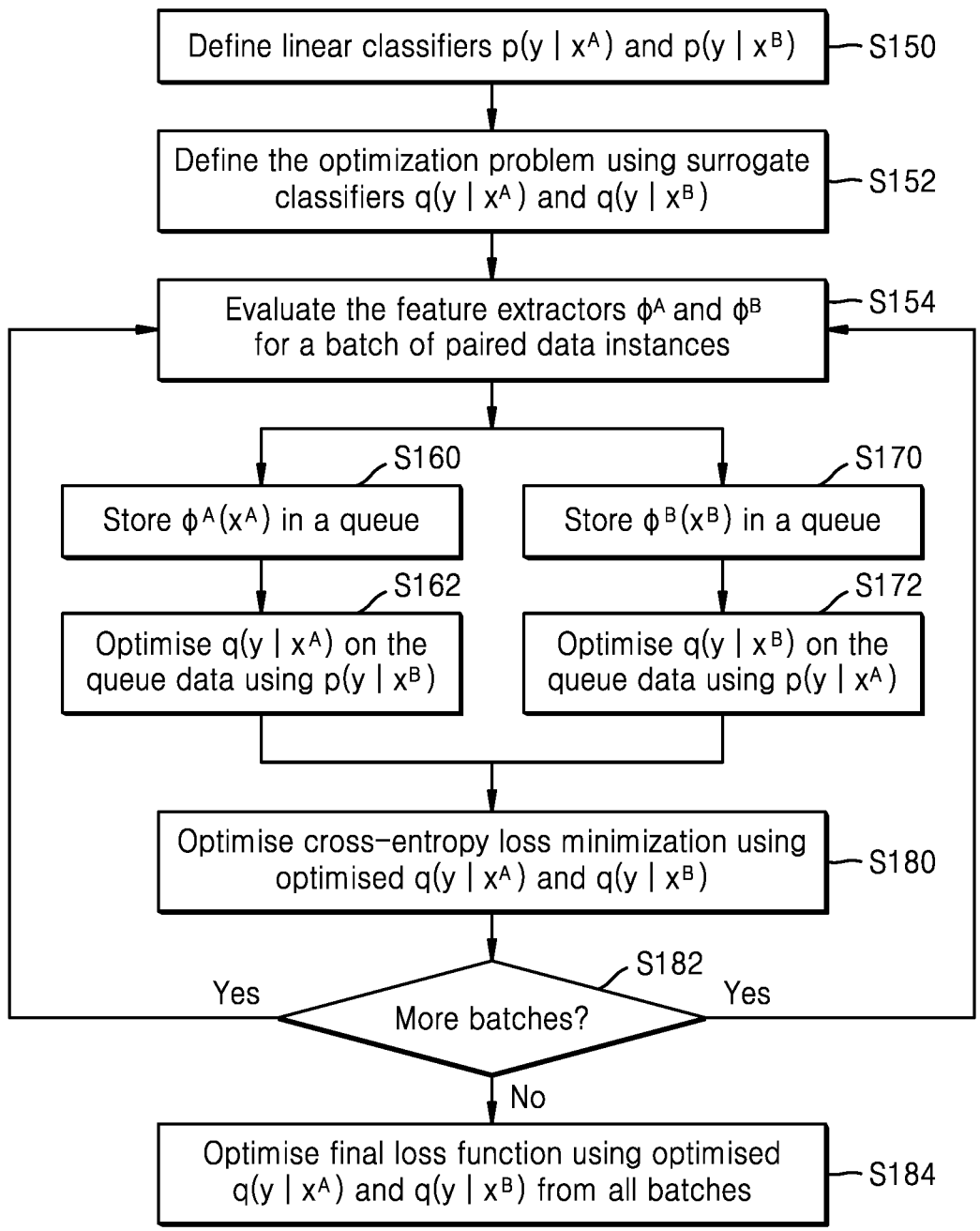
FIG. 7 is a flowchart illustrating the optimization process which may be incorporated in the method of FIG. 6.

FIG. 7 schematically illustrates the steps which may be applied in the optimization process. In a first step S150, linear classifiers $p(y|x^A)$ and $p(y|xB)$ are defined as in equations (2) and the linear classifiers have a set of trainable parameters P which are shared between the two modalities. The next step S152 is to define the surrogate linear classifiers $q^A$ and $q^B$ and the optimization problem using these surrogates. The optimization problems are defined in equations (3) and (4) and as shown optimal solutions for each of these linear classifiers denoted by $q^A$ and $q^B$ are found using the information from the other modality. In other words, $q^A$ is found using the estimate for $p(y|x^B)$ and $q^B$ is found using the estimate for $p(y|x^A)$ as detailed in equations (3) and (4). In this step, the trainable parameters P and the current feature extractors $\phi^A$, $\phi^B$ are fixed.

As explained above, the optimization problem of step S152 may be solved using the Sinkhorn-Knopp (SK) algorithm. Batches of data are processed to improve the optimization process and thus at step S154, a batch of paired data instances are selected from the dataset and the feature extractors $\phi^A$, $\phi^B$ are evaluated for this batch of data. The evaluations of the feature extractors are stored in queues (FIFO). At step S154, the updated feature extractors $\phi^A$, $\phi^B$ from step S180 may be used.

Thus at step S160, the embeddings $\phi^A(x^A)$ from the latest batch are stored in a queue with other data from earlier minibatches and similarly, at step S170, the embeddings $\phi^B(x^B)$ from the latest batch are stored in a queue. Using the queue data, it is possible to optimise $q^A$ and $q^B$ and as shown at steps S162 and S172, the optimization is done using $p(y|x^A)$ and $p(y|x^B)$.

Once $q^A$ and $q^B$ have been obtained, a loss function may be used to optimise the trainable parameters P together with the feature extractors $\phi^A$, $\phi^B$. An example of a suitable loss function is the cross-entropy loss minimisation shown in equation (5). This optimization of step S180 may be achieved using gradient descent and uses only the current minibatch portion of $q^A$ and $q^B$. There is a step S182 of determining whether there are more batches of data to be processed and if so, the process reiterates through steps S154 to S180.

Once there are no more batches to process, the final loss function may be optimised at step S184. As explained above, this optimization may use equation (7) which includes the contrastive loss function but this is an optional part of the equation which may be omitted although at least in some circumstances, including the contrastive loss function may improve the overall result. As an alternative to including the contrastive loss function, other known loss functions could be augmented with the SwAMP loss function. As described in the sketch based image retrieval example, the final loss function may include triplet loss, domain loss and semantic loss as described in the Doodle2Search paper by Dey et al. The final optimization optimises over the trainable parameters P and the feature extractors $\phi^A$, $\phi^B$. The final trained model may then be output at the end of the process. The model may be output to another device, e.g. an apparatus or user device for using the model.

In an embodiment, a computer-implemented method for performing cross-modal retrieval using a trained machine learning, ML, model.

In an embodiment, wherein the cross-modal retrieval problem is selected from text-based video retrieval, sketch-based image retrieval and image-text retrieval.

We test the proposed SwAMP loss on several different types of real-world cross-modal retrieval problems: text-based video retrieval, sketch-based photo image retrieval, and image-text retrieval. For each problem/dataset, we choose the most popular and successful method in the literature, and replace its loss function (mostly contrastive loss) with the proposed SwAMP loss to demonstrate the performance improvement. To this end, for fair comparison, we faithfully follow the same optimization strategy and hyperparameters as the baseline methods. First we provide proof-of-concept synthetic experiments and ablation study on the hyperparameters of SwAMP.

Synthetic Data

In this section we devise a synthetic dataset not only for performing the proof-of-concept test of our SwAMP algorithm, but also analyze the impacts of the various hyperparameters and training options in the proposed algorithm. For the former, we especially focus on the retrieval performance improvement achieved by our SwAMP compared to the contrastive loss or its popular variants (e.g., online hard-example mining loss).

The dataset is constructed by the following procedure: We randomly generate 20 Gaussians in $\mathbb{R}^5$, each of which is considered to represent a semantic class. For each Gaussian (class), we sample a latent vector $z \in \mathbb{R}^5$, and a pair of instances $(x^A \in \mathbb{R}^{100}, x^B \in \mathbb{R}^{100})$ is then generated by $x^A = f_A(z)$ and $x^B = f_B(z)$ where $f_A$ and $f_B$ are randomly initialized fully-connected DNNs with two hidden layers of 50 units. We generate 500 pairs for each class that leads to 10,000 data pairs, and split them into 7000/1000/2000 train/validation/test sets. The validation recall-at-1 (R@1) performance is evaluated at every training epoch, and the model at the epoch with the best validation performance is selected as the final model. Note that during training we only use the paired data $(x^A, x^B)$ with the semantic class labels hidden to the training algorithms.

For training, we adopt the embedding networks $\phi^A(x^A)$ and $\phi^B(x^B)$ as fully-connected neural nets with two hidden layers of 50 units. The embedding dimension is chosen as 5. We train the model with this same network architecture, using the contrastive loss and our SwAMP loss. For both loss functions, the batch size is 128, and the Adam optimizer described in Adam: "A Method for Stochastic Optimization" by Kingma and Ba published in International Conference on Learning Representations 2015 is used with learning rate $10^{-3}$, and the maximum epoch is 100.

For the contrastive loss, we adopt the (online) hard-example mining with the margin parameter $\alpha=0.1$. For the SwAMP loss, the defaults parameters are as follows: temperature $\tau=0.01$ for the softmax classifier, the reciprocal impact of the max-entropy regularizer for the Sinkhorn-Knopp $\eta=1/0.05$ (i.e., we add the entropic regularizer with the weight $\eta^{-1}=0.05$ to the objective of the OT problem). Also, by default, we choose the number of classes K=1000 and the queue size 1,280, 10 times the batch size (and greater than K). For both loss functions, the embedding networks are initialized randomly.

For test, we perform the cross-modal retrieval task $x^A \to x^B$, treating each $x^A$ in the test set as a query, retrieving $x^B$ from the test set. There are two ways to define the retrieval error: i) pair-based which treats the retrieved $x^B$ as a correct retrieval only if the query $x^A$ and the retrieved $x^B$ are found as a pair in the data, and ii) class-based which compares only the classes of the query $x^A$ and the retrieved $x^B$. Hence the pair-based error is more strict than the class-based since it counts only the data item that appears in the data as correct retrieval, without comparing the semantic classes of the retrieved item and the query.

TABLE 1

Retrieval results on the synthetic data.

| Error type | Method | R@1 ↑ | R@5 ↑ | R@10 ↑ | Med-R ↓ |
|---|---|---|---|---|---|
| Pair-based | Contrastive | 84.10 | 98.60 | 99.55 | 1 |
|  | SWAMP | 90.80 | 99.95 | 100.0 | 1 |
| Class-based | Contrastive | 91.60 | 99.70 | 99.90 | 1 |
|  | SwAMP | 95.70 | 99.95 | 100.0 | 1 |

In the table above, R@K is the % of a true item found in model's top-K retrieved items and Med-R is the average median rank of a true item in the model's ranking of all search items.

Ablation Study on Hyperparameters

There are several hyperparameters in our SwAMP model, and we have conducted several ablation-type study on the impacts of the hyperparameters. The hyperparameters that are deemed to be the most critical are: i) the number of classes K, ii) the size of the queues, iii) initialization of the feature extraction networks (either random initialization or pretrained one with the contrastive loss), iv) entropic regularization trade-off $\eta$ in Sinkhorn-Knopp, and v) the soft/hard cluster assignment after OT clustering.

Number of classes (K). We vary the number of classes K from {200,500,1000,2000,3000}, and record the R@1 scores for both pair and class based error types for our SwAMP model. The results are shown in FIGS. 8A and 8B. We see that allowing more clusters improves the performance. However, once K is around 1000 or greater than 1000, there is no significant benefit of increasing K. This implies that SwAMP does not merely do instance discrimination, but seeks for grouping/clustering of similar instances. Although we did not include it in the figure, having K=20, i.e., the true number of semantic classes, yielded poor performance (worse than K=200). This means that it is very difficult to expect that the model would discover the underlying semantic classes correctly. The number of classes may thus be between 500 and 1000, more particularly between 700 and 1000.

Size of queues. Another important hyperparameter is the size of the queues, where the OT clustering is performed on the latest features that are stored in the queues. In addition to the default queue size 1280=10×128 (batch size), we try with different queue sizes {0,1,2,5,20}×128. Note that the OT clustering is performed on the union of the features in the queue and the current batch, hence zero queue size implies that we only use the current batch for OT clustering. The results are reported in FIGS. 9A and 9B. As shown, increasing the queue sizes accordingly improves the performance, where with the queue size of two times the batch size outperforms the contrastive loss. Also, not using the queues ("No queue") resulted in poor performance, signifying the importance of using the queues. Interestingly, too large queue size (20×) deteriorates the performance, which might be explained by the negative effects of the stale features obtained several iterations ago from the old feature extractor networks. This suggests the trade ff of the queue size: too small queue size does not generalize well to the clustering of entire data, while too large queue size can be harmful due to the inconsistent stale features. The queue size may be between 2 and 10 times the batch size.

Figure 10A:
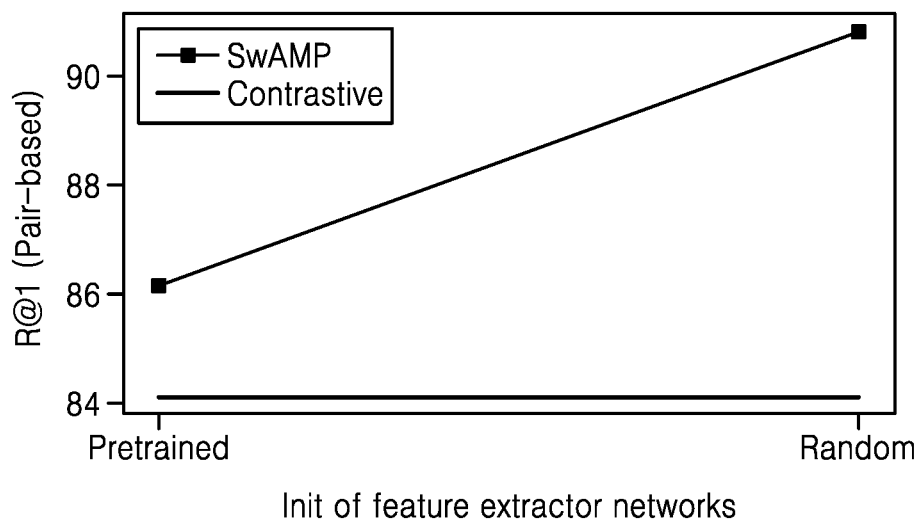
FIGS. 10A and 10B plot the variation in percentage of the true item found as the top retrieved item against initialization of the feature extractor networks for the SwAMP method compared with the contrastive loss method using pair-based error types and class-based error types respectively.
Figure 10B:
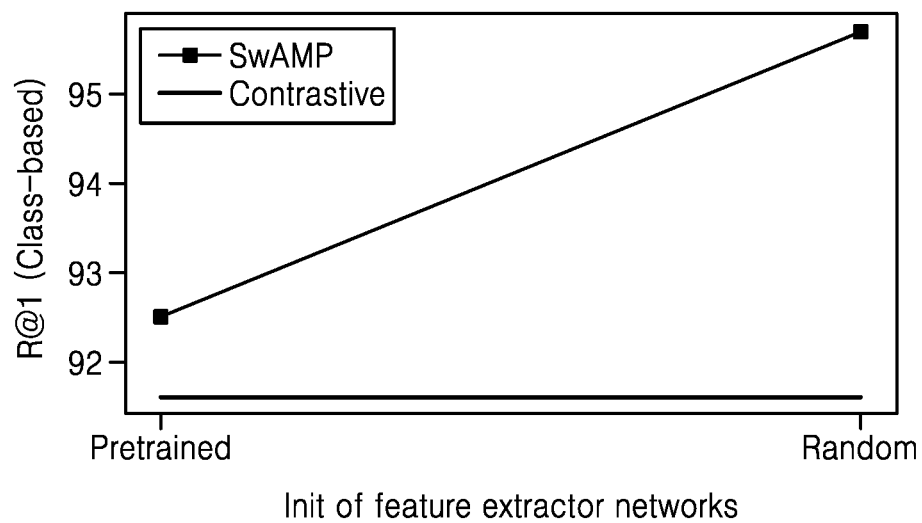

Initialization of feature extractor networks. In our default setup, the feature extractor networks $\phi^A(\cdot)$ and $\phi^B(\cdot)$ are initialized randomly. Now we test the performance of the SwAMP when the feature extractor networks are initialized from the pretrained ones by the contrastive loss training. We initially expected that this warm-start training may expedite the training with the SwAMP loss, however, as the results in FIGS. 10A and 10B indicates, it does not outperform the random initialization although the warm-start is still better than contrastive loss training. This may imply that the SwAMP loss defines a very different loss landscape from the contrastive loss, and the contrastive-loss optimized model may lie at the region far from the optima of the SwAMP loss, thus the warm-start even hinders convergence to the SwAMP optima.

Figure 11A:
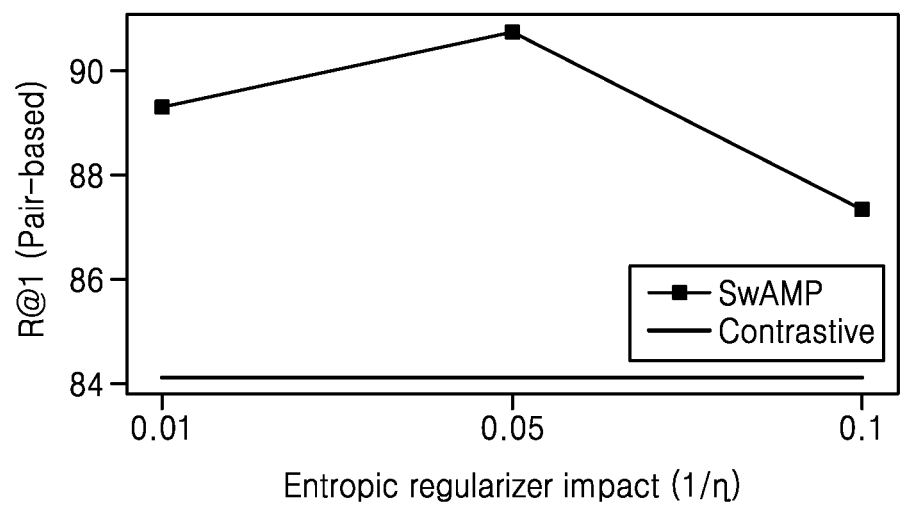
FIGS. 11A and 11B plot the variation in percentage of the true item found as the top retrieved item against $1/\eta$ for the SwAMP method compared with the contrastive loss method using pair-based error types and class-based error types respectively.
Figure 11B:
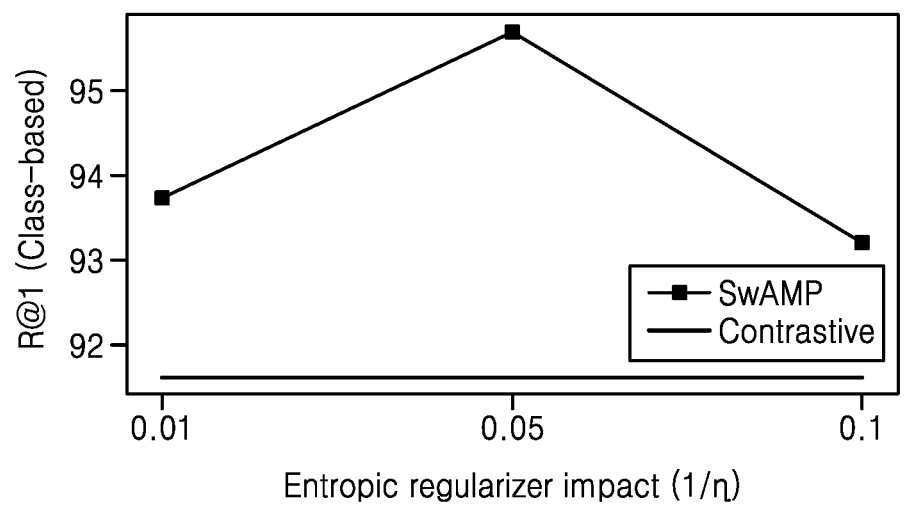

Impact of the entropic regularization (1/$\eta$). In the Sinkhorn-Knopp (SK) algorithm, we have the reciprocal trade-off 1/I for the entropy term of the optimization variables q(y|x). Too much emphasizing the entropy term (by increasing 1/$\eta$ or decreasing q) would lead to near uniform q(y|x), which means that it carries little information about the meaningful classes, and cluster assignment can be more or less random. On the other hand, having too small impact of the entropy term would make the SK algorithm converge too slowly, and the output of the SK with only a few iterations would produce non-optimal solutions. To see the impact, we vary $1/\eta$ from 0.01, 0.05 (default), and 0.1, and the results are shown in FIGS. 11A and 11B. We see that there is slight performance degradation for small and large $1/\eta$ values from the optimal choice. The entropy term may be approximately 0.05.

Soft or hard cluster assignment after OT. As is known in the art, hard cluster assignment means to assign a cluster label to a data point in all-or-nothing manner, whereas soft assignment is to assign probability values. Merely as an example, for the case in which K=3 (i.e. there are clusters 1,2 and 3), hard cluster assignment means that a data point is assigned to clusters (0,1,0) meaning that it belongs to the cluster 2, nothing else. By contrast for soft cluster assignment, we may assign a data point is assigned to clusters (0.1, 0.8, 0.1) meaning that the probability of belonging to cluster 2 is 80% and the rest 10%. So the soft cluster assignment method allows uncertainty in cluster assignment and means that the objective remains differentiable which is not true for hard cluster assignment.

Figure 12A:
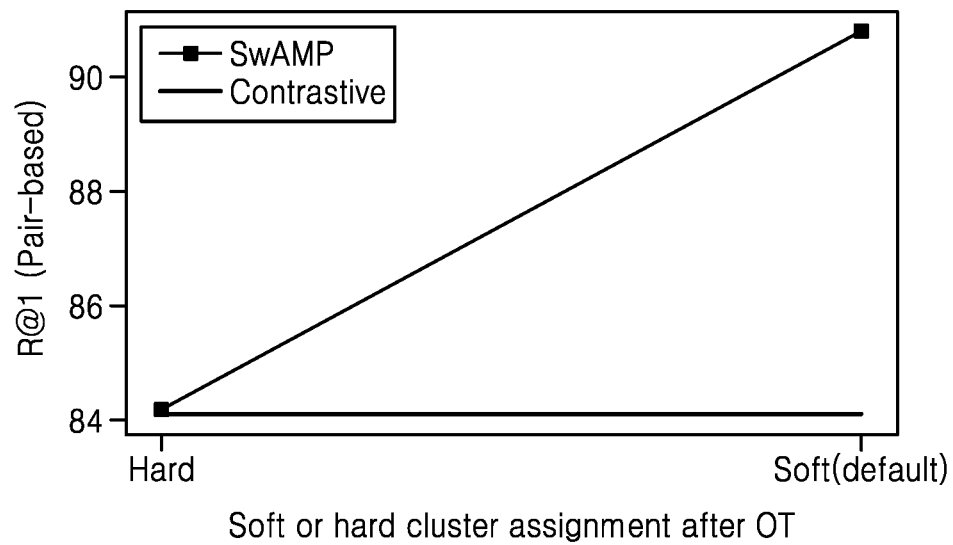
FIGS. 12A and 12B plot the variation in percentage of the true item found as the top retrieved item against hard or soft cluster assignment for the SwAMP method compared with the contrastive loss method using pair-based error types and class-based error types respectively.
Figure 12B:
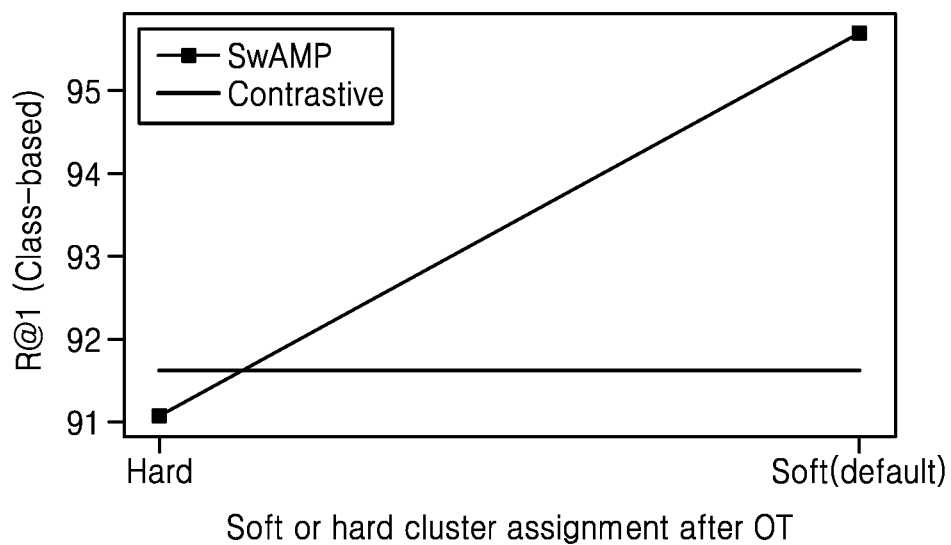
Figure 13:
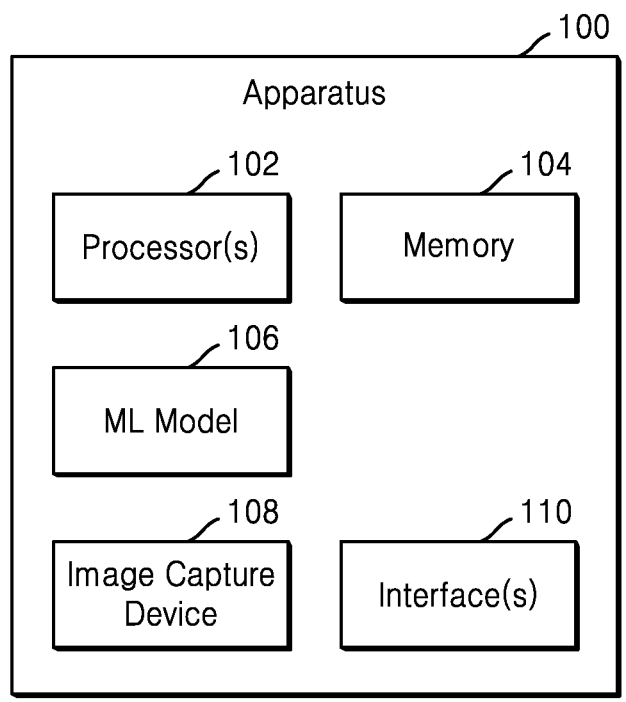
FIG. 13 shows a block diagram of an apparatus for implementing the trained model.

We also check if the hard cluster assignment thresholding after OT optimization would be beneficial or not. Recall that the default is to use the output $q(y|x)$ of the SK algorithm as it is (i.e., soft cluster assignment). In the hard assignment we further threshold $q(y|x)$ to have one-hot encoding, which is then used in the cross-entropy loss optimization. As shown in FIGS. 12A and 12B, the hard assignment is harmful, which implies that retaining uncertainty in cluster estimation is important to have accurate clustering and feature learning.

Text-Based Video Retrieval

We consider the text-to-video retrieval task where the goal is to find the most relevant video clip for a given natural language text query. We consider three datasets for this task: i) YouCook2 ["Towards automatic learning of procedures from web instructional videos" by Zhou et al published in The Thirty-Second AAAI Conference on Artificial Intelligence in 2018] of cooking videos and instructions, ii) MSR-VTT ["A large video description dataset for bridging video and language" by Xu et al published in IEEE/CVF Conference on Computer Vision and Pattern Recognition in 2016] of generic videos and captions from YouTube, and iii) LSMDC ["Movie description" by Rohrbach et al published in International Journal of Computer Vision, 123: 94-120 in 2017] of movie clips and subtitles. All these datasets provide pairs of video clip and its text description, forming a multi-modal paired data format (text, video) which conforms to our SwAMP framework.

For the raw text/video features and the feature extractor networks, as well as the training/test protocols, we follow the methods in "HowTo 100M: Learning a Text-Video Embedding by Watching Hundred Million Narrated Video Clips" by Miech et al published in International Conference on Computer Vision in 2019. The features are specifically built by the following procedures. First, the raw features are obtained by the pretrained networks. The raw video features (4096D) are a concatenation of frame-level and video-level features extracted from the pretrained 2D/3D CNNs. The 2D features may be extracted using the ImageNet pre-trained Resnet-152, for example as described in "Momentum Contrast for Unsupervised Visual Representation Learning" by He et al published as arXiv preprint arXiv:1911.05722 in 2016. The Kinetics may be extracted using any suitable technique, for example the technique described in "Quo vadis, action recognition?A new model and the kinetics dataset" by Carreira and Zisserman published in IEEE/CVF Conference on Computer Vision and Pattern Recognition 2017. The 3D features may be extracted using the pretrained ResNeXt-101 16-frame model, for example as described in "Can spatiotemporal 3D CNNs retrace the history of 2D CNNs and ImageNet?" by Hara, Kataoka, and Satoh published in IEEE/CVF Conference on Computer Vision and Pattern Recognition in 2018 for 3D features). The raw text features (4096D) may be any suitable features, for example the GoogleNews pre-trained word2vec embeddings described in "Efficient estimation of word representations in vector space" by Mikolov et al available as arXiv preprint arXiv:1301.3781 in 2013 for the pre-processed transcribed video narrations with the common stop words removed.

Then the feature extractor networks $\phi^{video}(\cdot)$ and $\phi^{text}(\cdot)$ transform these raw features into 4096D features (i.e. a feature vector of 4096 dimensions) by the sigmoid-gated linear transform where the gating functions are two-layer linear networks, for example as described in "Learning a Text-Video Embedding from Incomplete and Heterogeneous Data" by Miech et al published in arXiv preprint arXiv:1804.02516 in 2018. We fix the raw features and train only the latter sigmoid-gated networks, which comprise about 67M parameters.

There are two training strategies: i) No-pretraining (No-PT) where the feature extraction networks are randomly initialized, and the training is done on the training split of the dataset, and ii) Pretraining (PT) where the feature extractors are first pretrained on the large-scale HowTo100M dataset as described in the paper by Miech published in 2019, and finetuned on the target dataset. The prior approach by Miech adopts the contrastive (triplet) loss for training the feature extractors. Although we also compare our approach with the state-of-the-arts, the main focus in this experiment is to demonstrate the performance improvement achieved by the proposed SwAMP loss against vanilla contrastive learning. The SwAMP hyperparameter $\lambda$, the weight/impact of the SwAMP loss against the contrastive loss is chosen as $\lambda=0.25$ for all three datasets, except the LSMDC-PT case for which $\lambda=0.1$. We also choose temperature in softmax $\tau=0.25$, entropic regularization trade-off in SK $\eta=5.0$, the number of classes K=500, and the queue size 2,048 for the SwAMP. The other learning hyperparameters common in SwAMP and contrastive losses are not changed from the prior art approach of Miech.

YouCook2. This cooking video dataset collected from YouTube, contains 89 recipes and 14 K video clips annotated with textual descriptions from paid human workers. The test data are formed by taking 3.5 K clips from the validation set, and the test set comprises of 3,350 pairs. The retrieval performance metrics are recall-at-k (R@k) with k=1,5,10 and the median rank (Med-R). Hence, the random guess attains R@1=0.03% Med-R=1,675. The results are summarized in Table 2. In the bottom four rows, we see the performance improvement achieved by the proposed SwAMP against the contrastive loss [Miech et al 2019]. For both training strategies, No PT (random model initialization) and PT (initialized with the HowTo100M-pretrained model), our SwAMP improves the retrieval performance significantly (e.g., about 12% reduction in Median Rank for the No PT case). SwAMP also outperform the CCA baseline FV-CCA described in "Associating neural word embeddings with deep image representations using Fisher vectors" by Klein et al published in IEEE/CVF Conference on Computer Vision and Pattern Recognition in 2015.

TABLE 2

Text-video retrieval results on YouCook2.

| Methods | R@1 ↑ | R@5 ↑ | R@10 ↑ | Med-R ↓ |
|---|---|---|---|---|
| Random | 0.03 | 0.15 | 0.3 | 1675 |
| FV-CCA | 4.6 | 14.3 | 21.6 | 75 |
| Contrastive (No PT) | 4.2 | 13.7 | 21.5 | 65 |
| SWAMP (No PT) | 4.8 | 14.5 | 22.5 | 57 |
| Contrastive (PT) | 8.2 | 24.5 | 35.3 | 24 |
| SwAMP (PT) | 9.4 | 24.9 | 35.3 | 22 |

In the table above, and each of tables 3 and 4 below, the improved scores of SwAMP over contrastive are boldfaced. It is also noted that R@K is the % of a true item found in model's top-K retrieved items and Med-R is the average median rank of a true item in the model's ranking of all search items. For these tasks, the query modality is the text (i.e. the caption) and the search modality is the video.

MSRVTT. This generic video-text dataset collected from YouTube contains videos of specific categories including music, sports, and movie. There are 200K video-caption pairs obtained by human annotation. We follow the retrieval training/test protocol described in the prior art approaches of Yu and Miech. The test set consists of 1K pairs and the results are reported in Table 3. The results of the SwAMP approach are compared to prior art approaches C+LSTM+SA+FC7 described in "Learning language visual embedding for movie understanding with natural language" by Torabi et al published as arXiv preprint arXiv:1609.08124 in 2016, VSE-LSTM described in "Unifying visual-semantic embeddings with multimodal neural language models" by Kiros et al published as arXiv preprint arXiv:1411.2539 in 2014, Temporal Tessellation described in "Temporal tessellation: A unified approach for video analysis" by Kauman et al published in Proceedings of the IEEE International Conference on Computer Vision in 2017, CT-SAN described in "End-to-end concept word detection for video captioning, retrieval, and question answering" by Yu et al published in IEEE/CVF Conference on Computer Vision and Pattern Recognition in 2017, and JSFusion described in "A joint sequence fusion model for video question answering and retrieval" by Yu et al published in European Conference on Computer Vision in 2018.

TABLE 3

Text-video retrieval results on MSRVTT.

| Methods | R@1 ↑ | R@5 ↑ | R@10 ↑ | Med-R ↓ |
|---|---|---|---|---|
| Random | 0.1 | 0.5 | 1.0 | 500 |
| C + LSTM + SA + FC7 | 4.2 | 12.9 | 19.9 | 55 |
| VSE-LSTM | 3.8 | 12.7 | 17.1 | 66 |
| SNUVL | 3.5 | 15.9 | 23.8 | 44 |
| Temporal Tessellation | 4.7 | 16.6 | 24.1 | 41 |
| CT-SAN | 4.4 | 16.6 | 22.3 | 35 |
| JSFusion | 10.2 | 31.2 | 43.2 | 13 |
| Contrastive (No PT) | 12.1 | 35.0 | 48.0 | 12 |
| SWAMP (No PT) | 15.0 | 38.5 | 50.3 | 10 |
| Contrastive (PT) | 14.9 | 40.2 | 52.8 | 9 |
| SWAMP (PT) | 19.0 | 42.4 | 55.2 | 8 |

As reported in Table 3, our SwAMP loss improves the performance over the contrastive learning significantly for both no-pretraining and pretraining cases: about 24% in R@1 in the No PT case, and 27% in the PT case. Furthermore, the SwAMP outperforms by a large margin all of the state-of-the-art approaches.

LSMDC. The LSMDC is a dataset of movie video clips, comprised of 101K video-caption pairs. The captions are collected either from the movie scripts or the audio descriptions. The test set contains 1K pairs and the results are reported in Table 4 alongside the results from the prior art approaches described in relation to Table 3. For this LSMDC dataset, we use the SwAMP hyperparameter (impact of the SwAMP loss against the contrastive loss) $\lambda=0.1$ for the PT case. Similar to the other two datasets, our SwAMP is consistently better than the contrastive learning (about 7~9% in Median Rank).

TABLE 4

Text-Video retrieval results on LSMDC.

| Methods | R@1 ↑ | R@5 ↑ | R@10 ↑ | Med-R ↓ |
|---|---|---|---|---|
| Random | 0.1 | 0.5 | 1.0 | 500 |
| C + LSTM + SA + FC7 | 4.3 | 12.6 | 18.9 | 98 |
| VSE-LSTM | 3.1 | 10.4 | 16.5 | 79 |
| SNUVL | 3.6 | 14.7 | 23.9 | 50 |
| Temporal Tessellation | 4.7 | 15.9 | 23.4 | 64 |
| CT-SAN | 4.5 | 14.1 | 20.9 | 67 |
| JSFusion | 9.1 | 21.2 | 34.1 | 36 |
| Contrastive (No PT) | 7.2 | 18.3 | 25.0 | 44 |
| SWAMP (No PT) | 7.7 | 19.3 | 27.7 | 40 |
| Contrastive (PT) | 7.1 | 19.6 | 27.9 | 40 |
| SWAMP (PT) | 8.3 | 20.0 | 28.9 | 37 |

Sketch-Based Image Retrieval

We next test the SwAMP approach to the sketch-based image retrieval task. The model takes a user's sketch (quick drawing) of an object as an input query, and retrieves the photo images that correspond to the same object category as that of the query. Thus, for this task, the query modality is the sketch image (i.e. the human's quick drawing) and the search modality is the photo image. Sketch-to-image retrieval gains a lot of attention these days due to the pervasive availability of the touch screen or similar drawing devices.

We follow the recent framework from "Doodle to Search: Practical Zero-Shot Sketch-based Image Retrieval" by Dey et al published in IEEE/CVF Conference on Computer Vision and Pattern Recognition (CVPR) in 2019. This article also reports the state-of-the-art performance on the three large-scale sketch-image benchmark datasets: the Sketchy-Extended dataset described in "The sketchy database: Learning to retrieve badly drawn bunnies" by Sangklov et al published in ACM Transactions on Graphics, 35(4): 1-12.Schroff, F in 2016; the TU-Berline-Extended dataset described in "How do humans sketch objects?" by Eitz et al published in ACM Transactions on Graphics, 31(4): 1-10 in 2012, and the QuickDraw-Extended dataset which is described in the article by Dey et al. The datasets roughly consist of 100-200 object categories with hundreds to thousands of sketch/photo images for each category. For all these datasets, we have zero-shot setting, meaning that training/test splits have instances from disjoint object categories.

In this experiment we aim to show the improvement in the retrieval performance when our SwAMP loss is augmented to the existing loss function. To this end, we follow the same embedding networks for images and sketches, as well as the same loss function as the Doodle2Search. The loss function consists of three losses: Triplet loss is the conventional triplet loss, Domain loss uses adversarial domain classifier to penalize misalignment between distributions of embeddings of photo images and sketches, and Semantic loss urges the embeddings of the photo images and sketches to reconstruct the pretrained word embedding of the corresponding object word. We also use the same attention-based embedding networks for photo and sketch modalities. Then, we add our SwAMP loss to the Doodle2Search's loss with the impact λ=0.1 for all three datasets. The combined loss function may thus be defined as:

$$L_c(\phi^A,\phi^B)+a_d L_d(\phi^A,\phi^B)+a_{sm}L_{sm}(\phi A,\phi B)+\lambda L_S(P,\phi^A,\phi^B)$$

where the first and the last terms are the same as equation (7), and $L_d$ is the domain loss, $L_{sm}$ is the semantic loss, and a are mixing proportions.

We use the queue size 1,000 (2,000 for the QuickDraw-Extended dataset) and class cardinality K=500, softmax temperature τ=0.25, entropic regularization impact η=5.0. The resulting retrieval performances on the three datasets are summarized in Table 5. The performance is compared to three prior art methods: Doodle2Search (denoted by D2S) which is described in the Dey article; ZSIH described in "Zero-shot sketch-image hashing" by Shen et al published in IEEE/CVF Conference on Computer Vision and Pattern Recognition and CVAE described in "A zero-shot framework for sketch based image retrieval" by Yelamarthi et al published in European Conference on Computer Vision in 2018.

TABLE 5

Sketch-based image retrieval results on three sketch datasets.

| Methods | Sketchy-Extended [Sangkloy et al 2016] | | | TU-Berline-Extended [Eitz, Hays and Alexa 2012] | | |
|---|---|---|---|---|---|---|
| | mAP | mAP@200 | P@200 | mAP | mAP@200 | P@200 |
| ZSIH | 25.40 | — | — | 22.00 | — | — |
| CVAE | 19.59 | 22.50 | 33.30 | 0.50 | 0.90 | 0.30 |
| D2S | 36.91 | 46.06 | 37.04 | 10.94 | 15.68 | 12.08 |
| SwAMP | 40.32 | 51.94 | 40.81 | 17.63 | 24.49 | 19.75 |

| | QuickDraw-Extended [Dey et al 2019] | | |
|---|---|---|---|
| Methods | mAP | mAP@200 | P@200 |
| ZSIH | — | — | — |
| CVAE | 0.30 | 0.60 | 0.30 |
| D2S | 7.52 | 9.01 | 6.75 |
| SwAMP | 8.19 | 11.62 | 9.10 |

In the table above, the improved scores are marked in bold. As shown, our SwAMP loss when added to the existing contrastive-based loss described in the Dey article, significantly improves the retrieval performance (about 9% in mAP for the Sketchy dataset and about 60% for the TU-Berlin dataset). The metrics are mean average precision (mAP), mAP@200 which is the mean average precision of the items found in the model's top 200 retrieved items and P@200 which is the precision of the items found in the model's top 200 retrieved items.

Image-Text Retrieval

For the image-text cross-modal retrieval task, we follow the features and protocols from the well-known SCAN paper "Stacked Cross Attention for Image-Text Matching" by Lee et al published in European Conference on Computer Vision in 2018. Thus, each image may be represented by a set of local features $v_i$:

$$V=\{v_1,\ldots,v_k\},$$

$$\text{with } v_i \in \mathbb{R}^D)=W_v f_i+b_v, \text{ and}$$

where the raw features $f_i$ s are fixed and $\{W_v, b_v\}$ are learnable parameters. The $f_i$s are the CNN features extracted from salient image regions detected by the Faster-R-CNN model described in "Faster R-CNN: Towards real-time object detection with region proposal networks" by Ren et al published in Advances in Neural Information Processing Systems in 2015. The text (sentence) is also treated as a set of word features $e_i$:

$$E=\{e_1,\ldots,e_n\},$$

where $e_i(\in \mathbb{R}^D)=(h_i^{lr}+h_i^{rl})/2$ where $h_i^{lr/rl}$ are the outputs of the bi-directional GRU (gated recurrent unit) with the sequence of word embeddings as input. These outputs may be determined as explained in "Neural machine translation by jointly learning to align and translate" by Bahdanau et al published in International Conference on Learning Representations in 2015 or "Bidirectional recurrent neural networks" by Schuster et al published in IEEE Transactions on Signal Processing, 45(11): 2673-2681 in 1997. Both the word embeddings and GRU parameters are learnable. These image/text features contain rich local information, however, one challenge is that both representations are sets, hence the number of elements (k and n) can vary from instance to instance.

In the original SCAN paper, they proposed a cross-modal attention model, where each local feature from one modality is transformed by the attention with the set of local features in the other modality; e.g., $v_i$ is transformed to attn($v_i$; $\{e_j\}_{j=1}^n$)=the weighted sum of values $\{e_j\}_{j=1}^n$ with $v_i$ as a query and $\{e_1\}_{j=1}^n$ as keys (this denoted by i-t) or $e_i$ is transformed to attn($e_i$; $\{v_j\}_{j=1}^n$)=the weighted sum of values $\{v_j\}_{j=1}^n$ with $e_i$ as a query and $\{v\}_{j=1}^n$ as keys (this denoted by t-I and can be used alternatively to the previous transformation). Then the similarity score between image V and text E is defined as $$\text{pool}(\{\cos(v_i,\text{attn}(v_i;\{e_j\}_{j=1}^n))\}_{i=1}^K),$$

where cos(a, b) is the cosine similarity and pool is the pooling operation, either of AVG or LSE (log-sum-exp). Further information on the transformation is provided in "Attention Is All You Need" by Vaswani et al published in Advances in Neural Information Processing Systems in 2017. Then the triplet contrastive loss which is described in the Doodle2Search is employed.

Note that in the SCAN, there is no succinct modality-wise embedding vector representation, but the similarity score between instances of two modalities is rather computed by highly complex attention operations. Although this is helpful for capturing the interactions between local features, computing the similarity score takes quadratic time in the number of elements (local features) in the instances. This is time consuming compared to simple dot-product of the modality-wise embedding vectors (See Table 6 for the actual running times compared with the approaches based on modality-wise feature representation). Moreover, it is not applicable to our SwAMP approach since we need to predict the class labels for each modality from modality-wise representation $\phi^{image}(V)$, $\phi^{text}(E)$.

To have modality-wise representation, we adopt the idea of induced-set attention (ISA) from the Set Transformer which is described in "Set Transformer: A Framework for Attention-based Permutation-Invariant Neural Networks"

by Lee et al published in Proceedings of the 36th International Conference on Machine Learning, 3744-3753 in 2019. Specifically, we introduce p learnable prototype (query) vectors $\{q_j\}_{j=1}^{P}$ where $q_j \in \mathbb{R}^D$. In other words, the query vectors are learnable parameters which are used in feature extraction. We compute the attention for each query with the set of local features V for the image, i.e., $$z_j = \text{attn}(q_j; \{v_i\}_{j=1}^{k})$$

Then we define:

$$\phi^{image}(V) = \text{concat}(z_1, \ldots, z_p),$$

where concat refers to concatenation. Thus the parameters for $\phi^{image}(\ )$ are $\{W_v, b_v\}$ and the learnable prototpye vectors $\{q_j\}_{j=1}^{P}$.

Similarly for the set of local features E for the image, we compute the attention for each query:

$$z_j = \text{attn}(q_j; \{e_i\}_{i=1}^{k})$$

Then we define:

$$\phi^{image}(E) = \text{concat}(z_1, \ldots, z_p),$$

where concat refers to concatenation. Thus the parameters for $\phi^{text}(\ )$ are the word embeddings, GRU parameters, and $\{q_j\}_{j=1}^{P}$. We share the same $\{q_j\}_{j=1}^{P}$ for both modalities. We also have multi-head extension by computing these features multiple times and concatenating them. We call these modality-wise features a prototype attention representation (PAR). Note that computing PAR features has linear complexity in the number of local features (assuming p is constant), and the cross-modal similarity is simply dot-product of PAR features, and can be computed in linear time (See also Table 8 below). Computing the PAR features is part of the feature extraction and may thus be part of the step S104 in FIG. 6 and/or step S154 in FIG. 7 of evaluating the feature extractors Datasets and Results We test our approach on the popular image-text retrieval datasets, MS-COCO and Flickr30K. There are 31K images and five captions for each image in Flickr30K. MS-COCO contains 123,287 images, where each image is annotated with five text descriptions. Following the widely-used split described for example in "VSE++: Improved visual-semantic embeddings with hard negatives" by Faghri et al published in Proc. of British Machine Vision Conference in 2018, for the Flickr30K, we have 1K images for validation, 1K images for testing, and the rest for training. For MS-COCO, there are 5K test images (and 25K captions, five captions for each image). We also follow two standard protocols for measuring the test retrieval performance for MS-COCO: 1) using the entire 5K test images or 2) splitting the test set into 5 folds and report the average retrieval performance over the 5 folds.

The results are summarized in Table 6 (Flickr) and Table 7 (MS-COCO). In both tables, the results are compared with known prior art methods, including: DAN described in "Dual attention networks for multimodal reasoning and matching" by Nam et al published in IEEE/CVF Conference on Computer Vision and Pattern Recognition in 2017, DPC described in "Dual-path convolutional image-text embedding" by Zheng et al published as arXiv preprint arXiv:1711.05535 in 2017; VSE described in "VSE++: Improved visual-semantic embeddings with hard negatives" by Faghri et al published in Proc. of British Machine Vision Conference in 2018, SCO described in "Learning semantic concepts and order for image and sentence matching" by Huang et al published in IEEE/CVF Conference on Computer Vision and Pattern Recognition in 2018; GXN described in "Look, imagine and match: Improving textual-visual cross-modal retrieval with generative models" by Gu et al published in IEEE/CVF Conference on Computer Vision and Pattern Recognition in 2018] and PCN described in "Probabilistic Embeddings for Cross-Modal Retrieval" by Chun et al published in Proceedings of the IEEE/CVF Conference on Computer Vision and Pattern Recognition (CVPR), 8415-8424 in 2021. The results are also compared with different variations of the methods described in the original SCAN paper (i.e. "Stacked cross attention for image-text matching" by Lee et al published in the European Conference on Computer Vision in 2018. For example, SCAN i-t refers to transforming the features of the image modality by the attention with the features of the text modality and SCAN t-i refers to transforming the features of the text modality by the attention with the features of the image modality. AVG indicates that a pooling function in the form of an averaging function is used when calculating the similarity score and LSE indicates that a pooling function in the form of an log-sum-exp function is used when calculating the similarity score.

TABLE 6

Image-text retrieval results on Flickr30K.

| Methods | Image → Text | | | Text → Image | | |
|---|---|---|---|---|---|---|
| | R@1 | R@5 | R@10 | R@1 | R@5 | R@10 |
| DAN | 55.0 | 81.8 | 89.0 | 39.4 | 69.2 | 79.1 |
| DPC | 55.6 | 81.9 | 89.5 | 39.1 | 69.2 | 80.9 |
| VSE++ | 52.9 | — | 87.2 | 39.6 | — | 79.5 |
| SCO | 55.5 | 82.0 | 89.3 | 41.1 | 70.5 | 80.1 |
| SCAN i-t AVG | 67.9 | 89.0 | 94.4 | 43.9 | 74.2 | 82.8 |
| SCAN t-i AVG | 61.8 | 87.5 | 93.7 | 45.8 | 74.4 | 83.0 |
| SCAN t-i AVG + i-t LSE | 67.4 | 90.3 | 95.8 | 48.6 | 77.7 | 85.2 |
| Contrastive-PAR | 65.7 | 86.8 | 92.4 | 48.2 | 75.8 | 84.2 |
| SwAMP-PAR | 67.8 | 88.5 | 94.0 | 49.1 | 76.1 | 83.7 |

TABLE 7

Image-text retrieval results on MS-COCO.

| Methods | Image → Text | | | Text → Image | | |
|---|---|---|---|---|---|---|
| | R@1 | R@5 | R@10 | R@1 | R@5 | R@10 |
| | 5-fold (1K test images) | | | | | |
| DPC | 65.6 | 89.8 | 95.5 | 47.1 | 79.9 | 90.0 |
| VSE++ | 64.6 | — | 95.7 | 52.0 | — | 92.0 |
| GXN | 68.5 | — | 97.9 | 56.6 | — | 94.5 |
| SCO | 69.9 | 92.9 | 97.5 | 56.7 | 87.5 | 94.8 |
| PCME | 68.8 | — | — | 54.6 | — | — |
| SCAN i-t | 69.2 | 93.2 | 97.5 | 54.4 | 86.0 | 93.6 |
| SCAN t-i + i-t | 72.7 | 94.8 | 98.4 | 58.8 | 88.4 | 94.8 |
| Contrastive-PAR | 71.8 | 94.3 | 97.9 | 56.8 | 86.9 | 93.8 |
| SwAMP-PAR | 72.6 | 94.6 | 98.0 | 57.4 | 87.6 | 94.1 |
| | Entire (5K test images) | | | | | |
| DPC | 41.2 | 70.5 | 81.1 | 25.3 | 53.4 | 66.4 |
| VSE++ | 41.3 | — | 81.2 | 30.3 | — | 72.4 |
| GXN | 42.0 | — | 84.7 | 31.7 | — | 74.6 |
| SCO | 42.8 | 72.3 | 83.0 | 33.1 | 62.9 | 75.5 |
| PCME | 44.2 | — | — | 31.9 | — | — |
| SCAN i-t | 46.4 | 77.4 | 87.2 | 34.4 | 63.7 | 75.7 |
| SCAN t-i + i-t | 50.4 | 82.2 | 90.0 | 38.6 | 69.3 | 80.4 |
| Contrastive-PAR | 48.4 | 78.1 | 88.1 | 34.3 | 64.4 | 76.2 |
| SwAMP-PAR | 49.7 | 79.1 | 88.3 | 35.0 | 65.1 | 76.6 |

In the tables 6 and 7 above, the improved scores of SwAMP over contrastive are boldfaced. It is also noted that R@K is the % of a true item found in model's top-K retrieved items. For these tables, the query modality is the image and the search modality is the text (i.e. the caption or short description of the image) or the query modality is the text and the search modality is the image and denoted by the labels Image→Text and Text→Image, respectively.

We specifically highlight the comparison between the contrastive loss and our SwAMP loss with the modality-wise feature representation (Contrastive-PAR vs. SwAMP-PAR). For the PAR features, we choose the number of prototypes p=20, attention weight temperature T=0.5, and the number of heads H=1 for Flickr, and p=10, T=0.5, H=2 for MS-COCO. For the SwAMP hyperparameters, we use the impact of SwAMP loss $\lambda=1.0$, softmax temperature $\tau=0.025$, the number of classes K=1,000, queue size 1,280 for both datasets. As shown, the SwAMP loss performs consistently better than the contrastive loss. SwAMP also outperforms several state-of-the-arts including the recent sophisticated probabilistic embedding strategy labelled PCN.

When compared with the computationally expensive SCAN, SwAMP mostly outperforms SCAN except for the SCAN's best attention direction/combination choices. Note that SwAMP uses the simple feature aggregation strategy (PAR) to have fast and succinct modality-wise feature representation, whereas SCAN relies on the cross-modal attention similarity scoring model, which is computationally expensive.

To see the computational advantage of SwAMP-PAR, we compare the actual training/test times for the two approaches in Table 8, measured on the same machine with a single GPU (RTX 2080 Ti), Core i7 3.50 GHz CPU, and 128 GB RAM. We report per-batch times for training, and entire retrieval times for test. For MS-COCO test, the running times for 5K test images are reported, where times for 1K test images averaged over 5 folds are shown in the parentheses. For SCAN, when we use features in both directions (e.g., t-i AVG+i-t LSE), the running times are roughly doubled. As shown, our SwAMP-PAR is about 4 times faster than SCAN for training on both datasets, while the difference becomes even more pronounced during test; SwAMP-PAR is about two orders of magnitude faster than the cross-modal attention model.

TABLE 8

Running time comparison for SCAN (cross-modal attention) and our SwAMP-PAR.

| Methods | Flickr | | MS-COCO | |
|---|---|---|---|---|
| | Train | Test | Train | Test |
| SCAN i-t AVG | 0.35 | 336.9 | 0.33 | 9352.0 (350.3) |
| SwAMP-PAR | 0.09 | 3.8 | | 25.9 (16.3) |

The results above show the improvements offered by the proposed novel clustering-based loss function for cross-modal retrieval. The swapped class assignment over the modalities enables improved feature alignment with increased flexibility, while it helps reducing the sampling complexity significantly. The efficacy of our approach is demonstrated on several real-world cross-modal retrieval problems in diverse modalities, text-video, sketch-photo, and image-text and achieved significant performance improvement over the contrastive learning for all these tasks.

Once the model is trained, it is output to a device for use. FIG. 9 shows a block diagram of an apparatus (or device) 100 for storing and then implementing the trained model 106. The apparatus 100 may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, or a smart consumer device (such as a smart fridge). It will be understood that this is a non-exhaustive and non-limiting list of example devices.

The apparatus comprises the standard components, including for example at least one processor 102 coupled to memory 104. The at least one processor 102 may comprise one or more of: a microprocessor, a microcontroller, and an integrated circuit. The memory 104 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The apparatus may further comprise at least one image capture device 108 for capturing images or videos to be processed by the ML model. The apparatus may further comprise at least one interface 110 for a user to input other data to be processed by the ML model, e.g. a text query or a sketch query. The at least one interface may also provide a result of the processing by the ML model to a user of the apparatus. For example, the apparatus 100 may comprise a display screen to receive user inputs and to display the results of implementing the ML model 106.

As demonstrated above, the SwAMP approach can be applied to different types of cross-modal retrieval problems. Moreover, as empirically demonstrated, the SwAMP loss improves retrieval performance significantly over the contrastive learning, on various real-world cross-modal retrieval problems, including text-video, sketch-image, and image-text retrieval.

There are two main benefits of the SwAMP approach: i) Since the learning does not fully resort to pair-based losses as in contrastive learning, the sampling complexity is reduced. This comes from the class-based loss adopted in the SwAMP. ii) Unlike the contrastive loss, SwAMP does not make potentially wrong assumption that instances from different pairs are automatically irrelevant. The optimized class assignment finds similar instances from other pairs, and the feature extractor is trained in such a way that the same-class instances, even in different pairs, are well aligned. This feature of aligning instances in different pairs is hardly exploited in the contrastive loss.

As discussed previously, there are broadly two different ways to define the similarity metric between instances of different modalities: modality-wise feature representation and cross-modal attention. Examples of the cross-modal attention approach are described in "Stacked Cross Attention for Image-Text Matching" by Lee et al published in European Conference on Computer Vision in 2018, "VirTex: Learning Visual Representations from Textual Annotations" by Desai et al published as arXiv preprint arXiv:2006.06666 in 2020, "Pixel-BERT: Aligning image pixels with text by deep multi-modal transformers" by Huang et al published as arXiv preprint arXiv:2004.00849 in 2020 and "Vilbert: Pretraining task-agnostic visiolinguistic representations for vision-and-language tasks" by Lu et al published in Advances in Neural Information Processing Systems in 2019. The main benefit of the former is the computational efficiency, scalable to billions of instances at training/test time, thanks to the efficient dot-product. The latter directly computes the similarity score without having modality-wise representation using the transformer-like attentive neural networks. Although they can capture cross-modal interactions between local features of data instances from different modalities, they are computationally demanding and very slow due to the quadratic complexity in the number of local features. "Thinking Fast and Slow: Efficient Text-to-Visual Retrieval With Transformers" by Miech et al published in Proceedings of the IEEE/CVF Conference on Computer Vision and Pattern Recognition (CVPR), 9826-9836 in 2021 describes an hybrid of the two approaches which retains the two models, but performs re-ranking/distillation at test time for speed-up.

Clustering-based approaches. There were previous attempts to cluster (group) data instances, or equivalently self-labeling, to improve saliency in representation learning. Some approaches such as those described in "Deep Clustering for Unsupervised Learning of Visual Features" by Caron et al published in European Conference on Computer Vision in 2018 or "Self-Supervised Learning by Cross-Modal Audio-Video Clustering" by Alwassel et al published in Advances in Neural Information Processing Systems in 2020 perform offline K-means clustering for every epoch, which can make training slow. The idea of optimizing class labels in the representation learning was previously introduced in "Self-labelling via simultaneous clustering and representation learning" by Asano et al published in International Conference on Learning Representations in 2020 and "Unsupervised Learning of Visual Features by Contrasting Cluster Assignments" by Caron et al published in Advances in Neural Information Processing Systems in 2020. However, all these previous approaches aimed for self-supervised representation learning as an instance discrimination pretext task with augmented data. On the other hand, we perform simultaneous learning of class labels and the feature extraction networks for the cross-modal retrieval setting.

Proxy-based loss. Beyond the pair-based contrastive loss, a loss function based on the semantic class labels of data instances, known as proxy-based loss can also be used. As explained above, the proxy-based methods introduce learnable proxy vectors (class representatives), one for each class, and pull together data instances that belong to the same class toward the proxies. As the loss function is defined solely with distances between data instances and proxy vectors without pairwise distances, it reduces the sampling complexity to linear. The idea has been introduced in deep metric learning approaches such as proxy-NCA (described in "No Fuss Distance Metric Learning using Proxies" by Movshovitz-Attias published in International Conference on Computer Vision in 2017), SoftTriple (described in "Soft-triple loss: Deep metric learning without triplet sampling" by Qian et al published in Proceedings of the IEEE International Conference on Computer Vision in 2019), and the proxy-anchor (described in "Proxy Anchor Loss for Deep Metric Learning" by Kim et al published in IEEE/CVF Conference on Computer Vision and Pattern Recognition in 2020). However, unlike our new method described above (SwAMP), they deal with the supervised setup where the ground-truth semantic class labels are provided.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

What is claimed is:

1. A computer-implemented method for training a machine learning ML model comprising a first feature extractor for extracting image features from an image and a second feature extractor, the method comprising:
   obtaining a dataset comprising a plurality of pairs of data instances, with each pair comprising a plurality of first data instances having a first modality and a plurality of second data instances having a second modality, wherein the first data instance is an image;
   evaluating, using the second feature extractor, at least some of the plurality of second data instances to extract a set of features for each of the plurality of second data instances;
   assigning a first set of class labels to the plurality of first data instances based on the set of features for each of the plurality of second data instances;
   training the first feature extractor using the assigned first set of class labels;
   evaluating, using the first feature extractor, at least some of the plurality of first data instances to extract a set of image features for the plurality of first data instances;
   assigning a second set of class labels to the plurality of second data instances based on the set of image features; and
   training the second feature extractor using the assigned second set of class labels,
   wherein the assigning of the first set of class labels comprises determining clusters of first data instances based on extracted set of features and assigning each pair of data instances in a cluster same class label, and
   wherein the assigning of the second set of class labels comprises determining clusters of second data instances based on extracted set of image features and assigning each pair of data instances in a cluster same class label.

2. The method of claim 1, further comprising:
   iterating each of the evaluating, assigning and training steps for separate batches of data.

3. A non-transitory computer-readable recording medium having recorded thereon a program for executing, the method of claim 1.

4. The method of claim 1, wherein training the first feature extractor and training the second feature extractor uses cross-entropy minimization.

5. The method of claim 1, wherein training the first and second feature extractors comprises defining a first linear classifier for the first modality, a second linear classifier for the second modality and a set of training parameters which are shared between the first modality and the second modality.

6. The method of claim 5, wherein the first and second linear classifiers are denoted by $p(y|x^A)$ and $p(y|x^B)$ and are defined as, $$p(y=j|x^M) = \frac{\exp(p_j^T \phi^M(x)/\tau)}{\sum_l \exp(p_l^T \phi^M(x)/\tau)}, M \in \{A, B\}$$

where P={$p_1, \ldots, p_K$} are trainable parameters that are shared between the first modality and the second modality, $\phi^M$ represents the first and second feature extractors, $x^M$ represents the first and second feature data instances, y is the class label for class j, each $p_j$ may be regarded as prototype vector for class j that lies in shared feature space, and $\tau$ is temperature in softmax.

7. The method of claim 5, further comprising:
using optimization to obtain the first and second linear classifiers.

8. The method of claim 7, further comprising:
estimating a first surrogate for the first linear classifier using current second linear classifier; and
estimating a second surrogate for the second linear classifier using current first linear classifier.

9. The method of claim 8, wherein training the first feature extractor comprises updating the first feature extractor using the estimated first and second surrogates.

10. The method of claim 8, wherein training the second feature extractor comprises updating the second feature extractor using the estimated first and second surrogates.

11. The method of claim 8,
wherein the estimate for the first surrogate $q(y|x^A)$ is found using an optimization defined as $$Q_{iy}^A := q(y \mid x_i^A).$$
$$\min_{Q^A} \mathbb{E}_{i \sim \mathcal{D}}\left[\mathbb{E}_{q(y|x_i^A)}[-\log p(y \mid x_i^B)]\right]$$
$$s.t. \; \mathbb{E}_{i \sim \mathcal{D}}[q(y \mid x_i^A)] = 1/K, \; \forall \, y.$$

where $Q^A$ is an (N×K) matrix, N is a number of data instances $x_i^A$ in dataset $\mathcal{D}$, K is a number of class labels that y can have, $p(y|x_i^B)$ is current estimate of probability for $x_i^B$ that is paired with $x_i^A$ of the class label having a value of y; and
wherein the estimate for the second surrogate $q(y|x^B)$ is found using an optimization defined as $$Q_{iy}^B := q(y \mid x_i^B).$$
$$\min_{Q^B} \mathbb{E}_{i \sim \mathcal{D}}\left[\mathbb{E}_{q(y|x_i^B)}[-\log p(y \mid x_i^A)]\right]$$
$$s.t. \; \mathbb{E}_{i \sim \mathcal{D}}[q(y \mid x_i^B)] = \frac{1}{K}, \; \forall \, y.$$

where $Q^B$ is an (N×K) matrix, N is a number of data instances $x_i^B$ in the dataset $\mathcal{D}$, K is the number of class labels that y can have, $p(y|x_i^A)$ is current estimate of probability of the class label having a value of y for $x_i^A$ that is paired with $x_i^B$.

12. The method of claim 11, further comprising:
solving optimizations to estimate the first and second surrogates using Sinkhorn-Knopp (SK) algorithm.

13. The method of claim 11, further comprising:
selecting a batch comprising a plurality of pairs of data instances from the dataset; evaluating the first and second feature extractors for the selected batch;
storing a result of the evaluating in at least one queue; and
performing optimization on the queued result of the evaluating.

14. An apparatus for training a machine learning ML model the apparatus comprising:
a memory storing one or more instructions;
a machine learning model; and
at least one processor configured to execute the one or more instructions stored in the memory to:
obtain a dataset comprising a plurality of pairs of data instances, with each pair comprising a plurality of first data instances having a first modality and a plurality of second data instances having a second modality, wherein the first data instance is an image,
evaluate, using a second feature extractor, at least some of the plurality of second data instances to extract a set of features for each of the plurality of second data instances,
assign a first set of class labels to the plurality of first data instances based on the set of features for the plurality of second data instances,
train a first feature extractor using the assigned first set of class labels,
evaluate, using the first feature extractor, at least some of the plurality of first data instances to extract a set of image features for the plurality of first data instances,
assign a second set of class labels to the plurality of second data instances based on the set of image features, and
train the second feature extractor using the assigned second set of class labels,
wherein, to assign the first set of class labels, the at least one processor is further configured to:
determine clusters of first data instances based on the set of features; and assign each pair of data instances in a cluster same class label, and wherein, to assign the second set of class labels, the at least one processor is further configured to:
determine clusters of second data instances based on the set of image features; and assign each pair of data instances in a cluster same class label.

15. The apparatus of claim 14, wherein the at least one processor is further configured to:
define a first linear classifier for the first modality, a second linear classifier for the second modality and a set of training parameters which are shared between the first modality and the second modality.

16. The apparatus of claim 15, wherein the first and second linear classifiers are denoted by $p(y|x^A)$ and $p(y|x^B)$ and are defined as, $$p(y = j \mid x^M) = \frac{\exp(p_j^T \phi^M(x)/\tau)}{\sum_i \exp(p_i^T \phi^M(x)/\tau)}, \; M \in \{A, B\}$$

where P={$p_1, \ldots, p_K$} are trainable parameters that are shared between the first modality and the second modality, $\phi^M$ represents the first and second feature extractors, $x^M$ represents the first and second feature data instances, y is the class label for class j, each $p_j$ may be regarded as a prototype vector for class j that lies in a shared feature space, and $\tau$ is temperature in softmax.

* * * * *